United States Patent
Vaschillo et al.

(10) Patent No.: US 7,403,956 B2
(45) Date of Patent: Jul. 22, 2008

(54) RELATIONAL SCHEMA FORMAT

(75) Inventors: Alexander Vaschillo, Redmond, WA (US); Avner Y. Aharoni, Seattle, WA (US); Bertan Ari, Bellevue, WA (US); Alex Laskos, Redmond, WA (US); Adam J. Wiener, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 586 days.

(21) Appl. No.: 10/652,258

(22) Filed: Aug. 29, 2003

(65) Prior Publication Data

US 2005/0050069 A1 Mar. 3, 2005

(51) Int. Cl.
*G06F 17/00* (2006.01)

(52) U.S. Cl. ............ 707/104.1; 707/101; 707/102; 707/103 R

(58) Field of Classification Search ........... 707/1–10, 707/100–104.1, 200–206
See application file for complete search history.

(56) References Cited

U.S. PATENT DOCUMENTS

| | | | |
|---|---|---|---|
| 5,668,991 A * | 9/1997 | Dunn et al. ............... | 707/202 |
| 5,937,409 A * | 8/1999 | Wetherbee ............... | 707/103 R |
| 6,061,515 A | 5/2000 | Chang et al. | |
| 6,076,090 A | 6/2000 | Burroughs et al. | |
| 6,569,207 B1 | 5/2003 | Sundaresan | |
| 6,631,519 B1 | 10/2003 | Nicholson et al. | |
| 2002/0078094 A1* | 6/2002 | Krishnaprasad et al. ...... | 707/513 |
| 2003/0055828 A1* | 3/2003 | Koch et al. ............... | 707/10 |
| 2004/0044959 A1* | 3/2004 | Shanmugasundaram et al. | 715/513 |

OTHER PUBLICATIONS

Chaitanya Baru, XViews: XML Views of Relational Schemas, Proceedings of the Workshop on Databases and Expert System Applications, 1999, pp. 1-6, Florence, Italy.

Dongwon Lee, et al., NeT & CoT: Translating Relational Schemas to XML Schemas Using Semantic Constraints, Proceedings of the 11th International Conference on Information and Knowledge Systems, Nov. 4-9, 2002, pp. McLean, Virginia.

Iraklis Varlamis, et al., Bridging XML-Schema and Relational Databases: A System for Generating and Manipulating Relational Databases Using Valid XML Documents, Proceedings of the 2001 ACM Symposium on Document Engineering, 2001, pp. 105-114.

* cited by examiner

*Primary Examiner*—Isaac M Woo
(74) *Attorney, Agent, or Firm*—Amin, Turocy & Calvin, LLP

(57) ABSTRACT

A Relational Schema Definition (RSD) language that uses metadata of the relational database to generate an implementation-neutral or implementation-specific format that represents the precise database structure and data. The RSD language is a declarative description language such that an RSD file can then be used offline in a disconnected environment to reconstruct and use the database.

33 Claims, 6 Drawing Sheets

RELATIONAL SCHEMA FORMAT

TECHNICAL FIELD

This invention is related to data schemas, and more specifically, a way to represent a relational data schema in an XML format.

BACKGROUND OF THE INVENTION

Relational schemas are always implicitly stored in the database itself and can be retrieved by querying the database metadata. In addition, relational schemas can be represented by the DDL (Data Definition Language) statements that were used to create the schemas in the first place. However, neither of these formats can be used as a declarative, implementation-neutral format that can be easily stored in a file and used by applications to discover the relational schema.

What is needed is an improved architecture that represents relational schema in a declarative implementation-neutral and/or implementation-specific format.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a Relational Schema Definition (RSD) language that allows representing any relational schemas in an alternative declarative format, for example, XML format. In one embodiment, the RSD format is expressed as an XML-based language used to represent relational schemas. The RSD language component uses a tool to extract metadata of the relational database, and to format the metadata in to an RSD file. The RSD file represents the precise structure of the database, and in more robust implementations, the data, such that the corresponding database can be reconstructed when remote and disconnected therefrom. The file also contains information on the database type system, as well as the routines (functions and procedures) that are exposed by the database. This is particularly suited by a traveling user, who may use the RSD file to interact with the database while disconnected.

In another aspect thereof, the user can update the disconnected database via the RSD file, such that the updated RSD file can now be remerged with the original database to reflect changes made thereto by the user while disconnected.

In yet another aspect thereof, the RSD language component can be used to facilitate mapping between at least two different data models. The RSD file is generated into an XML format, which XML format is easily processed by software that interacts with other types of data models to which data mapping is desired.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
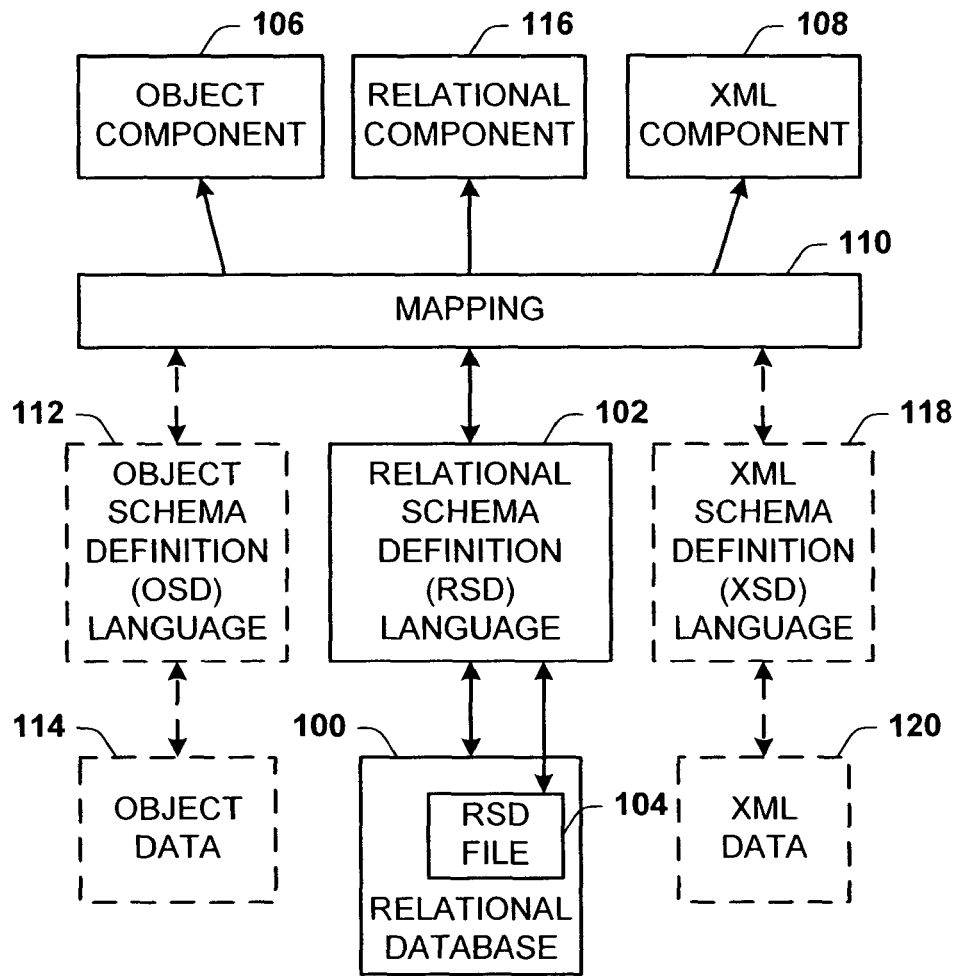
FIG. 1 illustrates a general block diagram of a system of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a general block diagram of a system of the present invention. The present invention provides the capability of allowing a user to work with a representative structure of a relational database 100 even though remote therefrom and disconnected. Such a scenario is common in that the user may be denied access rights and/or privileges to the relational database 100 or even to a network on which the database is disposed.

The disclosed architecture addresses the development of a Relational Schema Definition (RSD) language component 102 that generates an RSD file 104 that represents the complete structure and data of the relational database from which it is derived.

The RSD file 104 can then be made accessible to a user instead of the database 100 itself. This facilitates the user working with the database 100 indirectly via the RSD file 104 while traveling or in any scenario where the user is disconnected from the database 100 (e.g., the database is offline). The location of the RSD file 104 may be anywhere, e.g., in this embodiment, local to the relational database 100, such that the user can be given access to it. Of course, the user may be required to login to the network and/or the database 100 to gain access to the file 104, or may be given free access to the file 104. This implementation is at the discretion of the user.

The disclosed RSD language format is based upon an XML (eXtensible Markup Language) that is used to represent the relational schema. However, as indicated hereinabove, in lieu of XML, the relational schema can be represented with an alternative declarative language. The RSD component 102 includes a declarative, implementation-neutral format such that after relational database metadata is obtained, the RSD file 104 can easily be generated, stored, and used by applications to regenerate the relational schema of the database 100. Thus, the disclosed architecture facilitates use of the RSD file 104 in a remote and disconnected environment such that a user can take the RSD file 104 offline, and use the file 104 to regenerate the relational database 100 in its entirety for processing, instead of having to maintain a connection to the relational database 100 in order to access its contents.

Databases and XML offer complementary functionality for storing data. Databases store data for efficient retrieval, whereas XML offers an easy information exchange that enables interoperability between applications. To take advantage of XML features, database tables can be converted into XML documents. XML tools can be employed with such documents for further processing. XML documents can be presented as, for example, HTML (HyperText Markup Language) pages with XSLT (Extensible Stylesheet Language Transformation) stylesheets, can be searched with XML-based query languages such as XQuery (XML Query Language), can be used as a data-exchange format, and so on. For processing XML documents, XML tools can work with any suitable API, e.g., a DOM API ((Document Object Module Application Programming Interface). Thus, XML tools can be used to treat databases as if they were XML documents. This way, the need to convert a database is obviated.

It is preferable to have a file in a non-procedural declarative format that describes the schema of the relational database that is understandable by applications. It is written in the XML format and XML syntax, and consequently, is easy to parse, easy to load into an XML parsing API (e.g., DOM), and easy to understand.

The RSD language component 102 also facilitates moving (or mapping) data between the relational database 100 and an Object component 106 and/or an XML component 108 using a mapping component 110. This is accommodated by using a declarative means rather than a conventional procedural mechanism (e.g., executing C++ code against a result set abstraction to generate an object or an XML structure/component). The capability to map data from one data model to a different data model is a desirable operation in great demand with data environments of today. That is, data environments that are diverse, and employ a wide range of mechanisms and mediums for persisting and accessing data. With respect to Object data, XML data, and Relational databases, the means to map data between each of these different data structures is important, since users are continually modifying their data storage schemas, mediums, and processes.

Thus, there is provided the relational database 100 having a relational schema therein represented in the form of metadata, and from which the metadata can be retrieved by the RSD component 102 for generating the RSD file 104. The RSD language component 102 prepares the database data for mapping to another data model via the mapping component 110. The mapping component 110 can then map the data to at least the Object component 106 and/or the XML component 108. Note, however, that the RSD component 102 can be used in conjunction with the mapping component 110 to map relational data to an arbitrary domain.

The use of an Object Schema Definition (OSD) language component 112 to process Object data 114 for use by the XML component 108 and a Relational component 116, and an XSD language component 118 to process XML data 120 for use by the Object component 106 and the Relational component 116, are not part of this description, as indicated by dotted lines. Note that the particular source data (100, 114, and 120) and the associated language (102, 112, and 118) are not restricted to data transformation to a different target component (106, 108, and 116). That is, a scenario can exist where the source relational database 100 can be mapped to a target relational database (the relational component 116) having a different relational structure. Thus, the RSD language component 102 and mapping component 110 facilitate this process. Similarly, a scenario can exist where the source object data 114 can be mapped to a target object data model (the object component 106) having a different object structure. The OSD language component 112 and mapping component 110 facilitate this process. Still further, a scenario can exist where the source XML data 120 can be mapped to a target XML data model (the XML component 108) having a different XML structure. The XSD language component 118 and mapping component 110 facilitate this process.

Figure 2:
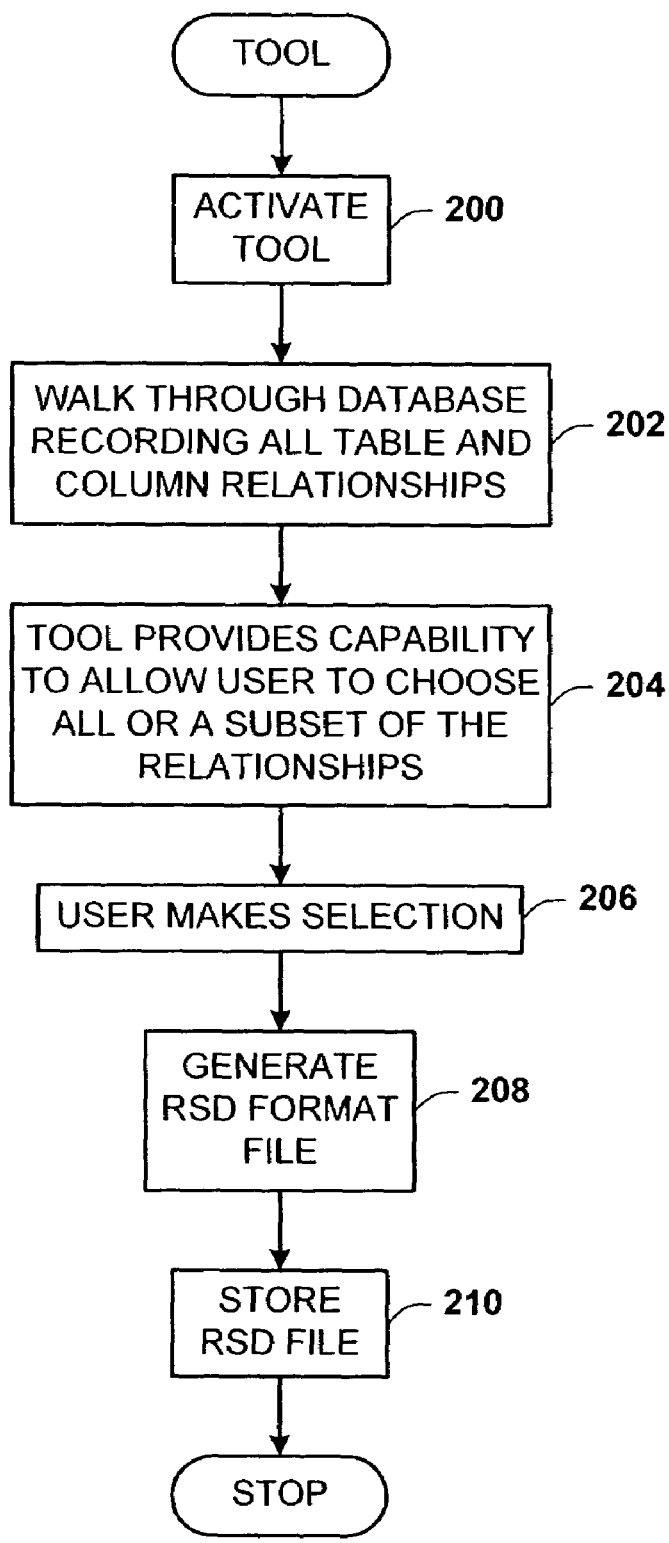
FIG. 2 illustrates a flow chart of a process for generating RSD from the relational database.

Referring now to FIG. 2, there is illustrated a flow chart of a process for generating RSD from the relational database. While, for purposes of simplicity of explanation, the one or more methodologies shown herein, e.g., in the form of flow chart, are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Flow begins at 200 where a tool of the disclosed architecture is activated according to trigger data. Some types of triggering events are described hereinbelow. At 202, the tool, as part of the RSD component, executes to walk through the relational database metadata to find the tables and columns and relationships therebetween. At 204, the tool provides the capability to allow the user to select all or a subset of the relationships for use in the RSD file. At 206, the tool allows the user to make a selection. At 208, the tool creates the RSD file of the selected relationships that precisely describe the database structure and data. At this point, optional extensions are included to support implementation-specific extensions and derivations from an ANSI (American National Standards Institute) standard schema (e.g., SQL Server, Oracle. At 210, the RSD file is stored for later access. The process then reaches a Stop block.

Figure 3:
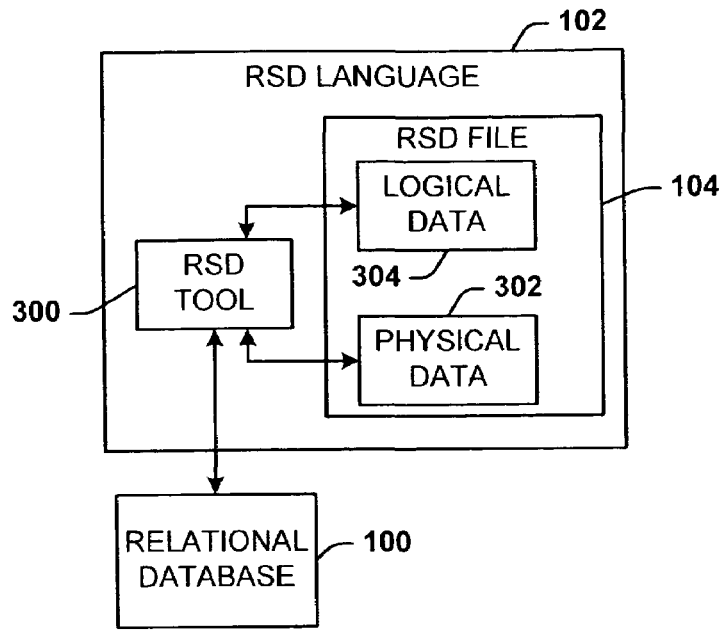
FIG. 3 illustrates a general block diagram of the RSD language component of FIG. 1.

Referring now to FIG. 3, there is illustrated a general block diagram of the RSD language component 102 of FIG. 1. The RSD component 102 includes a tool 300 for extracting the metadata from the relational database 100 and using the metadata to generate the RSD file 104. The overall schema of the RSD file 104 is a combination of physical information 302 (or elements) and logical information 304 (or elements) used to describe the relational database 100. The physical information 302 can be harvested directly from the database 100 automatically using the tool 300, while user annotations to that information are added incrementally to provide the logical element thereof. Annotations are made based upon user knowledge of the relationship between the database tables. This can be performed manually or automatically. Where automatically, a smart algorithm can be employed to derive the annotation information from, e.g., foreign key constraints. Thus the smart algorithm can walk through the database extracting this information for annotating the table relationships. This can be further automated by requiring a degree of certainty that the annotations are correct. Thus, if the user requires that the automated annotation process achieve a minimum 95% accuracy, performance less than this may require manual correction and review to ensure the database is precisely captured in the RSD file 104. This process can also be performed via a classification process that is described in greater detail hereinbelow.

A database is typically defined at least according to tables and columns. The relationships between tables are not well-defined, which are the logical components of the relational database. The logical elements are useful for representing the semantics of the database, for mapping the database to another data model, for modeling, etc. A way to obtain a "hint" at the table relationships is via a foreign key. In order to describe a relationship between tables, the logical element is used. Thus, given an RSD file, the relational database is recreated by using both the physical and logical elements. The tool 300 is sufficiently sophisticated to handle merge scenarios where the RSD file 104 has been updated by the user with logical information and is then refreshed from the database 100.

The following convention is adopted such that element names that are written in Times 12 plain text font are denoted as physical elements that are derived directly from the database 100. These elements are appropriately regenerated from the database 100 each time the generation tool is run. Element names that are written in Times 12 italics text font are denoted as logical elements that can be annotated with an IsLogical attribute. If the IsLogical attribute is TRUE, RSD generation tools respect the user-supplied extensions and do not overwrite that information when updating the RSD file 104 from the database 100.

The RSD file generation process can be initiated manually or automatically. Manual operation simply requires that the user initiate the process by way of a user interface or other communication means. When performed automatically, the tool 300 can be triggered to operate according to any number of trigger mechanisms. The RSD file generation process can be initiated according to predetermined time criteria (e.g., hourly, daily, weekly) to process the current state of the database. Thus, the RSD file 104 could be updated every ten minutes by running the tool to extract the latest state of the database. However, this fixed time increment may not provide that latest state of the database if the database is updated after the most recent RSD file generation.

Alternatively, the tool can be automatically activated to generate an updated RSD file 104 after a database change has been detected. For example, if it is determined that five percent of the database 100 has experienced changes, the tool 300 could be automatically triggered to update the RSD file 104.

Still alternatively, the tool can be activated to generate the RSD file 104 only when the database is accessed by a non-relational database query, either before the query is made, or after the query is completed. However, this too may involve more time then is desirable, since the requestor may then need to wait until the process complete, if performed before the query.

In another scenario, if certain portions of the database 100 are determined to be a higher priority data than other portions, then after changes have been made in the higher priority data, the tool could be automatically activated to update the RSD file 104.

Where the database is distributed on several servers across a network, the RSD file generation process may need to operate differently, as is described hereinbelow with respect to segmentation.

In FIG. 3, the RSD file 104 is illustrated local to the RSD component 102. This represents that the RSD file 104 can be generated and stored local to the RSD component 102, where the RSD component 102 is local to the database 100. Alternatively, the RSD file 104 can later be moved to the database 100 where the RSD component 102 is remote from the database 100. All that is important is that the file 104 is located where it can be readily accessed or provided to a user who needs access thereto.

Figure 4:
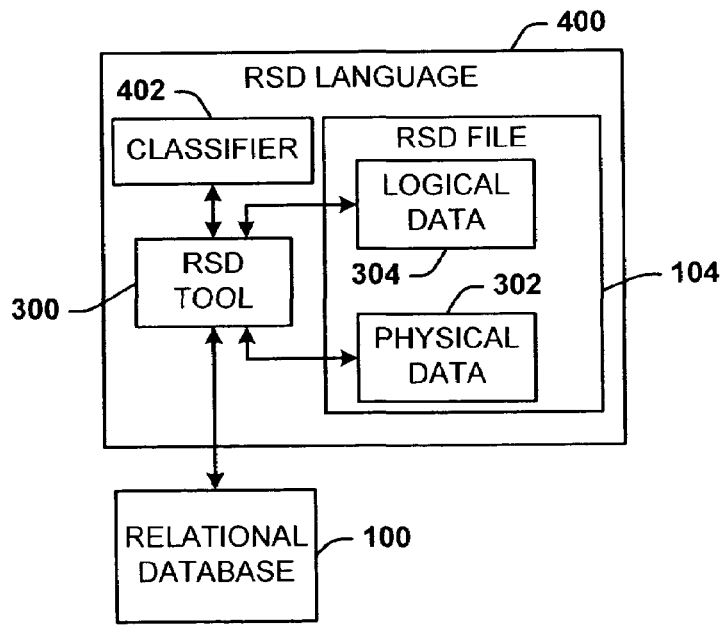
FIG. 4 illustrates a general block diagram of an RSD component that further employs a classifier to perform one or more automated functions.

Referring now to FIG. 4, there is illustrated a general block diagram of an RSD component 400 that further employs a classifier 402 to perform one or more automated functions. The subject invention (e.g., in connection with the RSD file generation process) can employ various artificial intelligence based schemes for carrying out various aspects of the subject invention. For example, a process for determining when the file 104 will be updated by the generation process can be facilitated via an automatic classification system and process. Moreover, where the database 100 is distributed over several locations, and each location has an associated RSD file 104 that represents the distributed database portion at that location, the classifier 402 can be employed to determine which location will be selected for regeneration, in what order the locations will be processed, and when the RSD file 104 will be regenerated.

A classifier is a function that maps an input attribute vector, $x=(x1, x2, x3, x4, xn)$, to a confidence that the input belongs to a class, that is, $f(x)=$confidence(class). Such classification can employ a probabilistic and/or statistical-based analysis (e.g., factoring into the analysis utilities and costs) to prognose or infer an action that a user desires to be automatically performed. In the case of database systems, for example, attributes are words or phrases or other data-specific attributes derived from the words (e.g., database tables, the presence of key terms), and the classes are categories or areas of interest (e.g., levels of priorities).

For example, a support vector machine (SVM) classifier can be employed. An SVM operates by finding a hypersurface in the space of possible inputs. This hypersurface will attempt to split the triggering criteria from the non-triggering events. Intuitively, this makes the classification correct for testing data that is near, but not identical to the training data. Other directed and undirected model classification approaches, including, e.g., naïve Bayes, Bayesian networks, decision trees, and probabilistic classification models providing different patterns of independence, can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically determine according to a predetermined criteria when the database RSD file is generated, when it is regenerated (i.e., updated), which RSD file of a distributed database is to be regenerated, etc. The criteria can include, but is not limited to, the amount of data to represented in the RSD file 104, the amount of data to be mapped (in a mapping operation), the type of data, the importance of the data, and the level of confidence requested for generating the RSD file 104.

Figure 5:
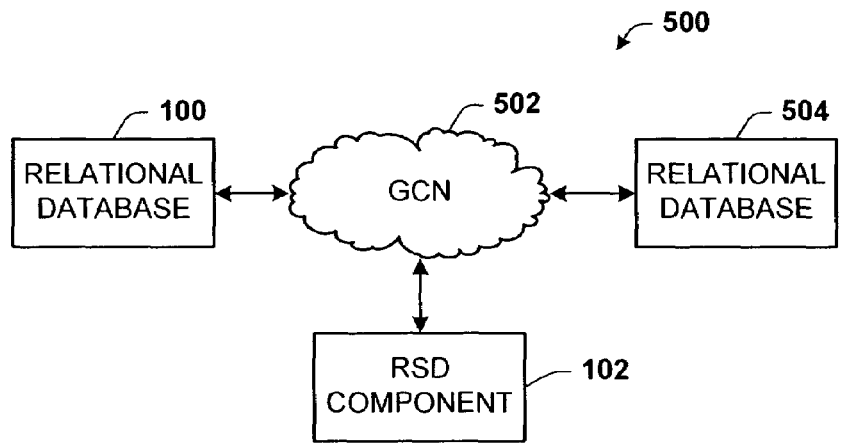
FIG. 5 illustrates a block diagram of a system where the RSD component is located remote to the relational database from at least one relational database.

Referring now to FIG. 5, there is illustrated a block diagram of a system where the RSD component 102 (or 400 as referenced in FIG. 4) is located remote to the relational database from at least one relational database 100. The database 100 and the RSD component 102 are disposed in communication on a network 502, e.g., the Internet. Thus, the RSD component 102 can be employed to remotely connect to the database 100 and perform generation of the RSD file that represents the structure and data thereof. The RSD file can then be stored local to the database 100 for access and use for various purposes, as described hereinabove.

There is provided a second relational database 504 disposed on the network 502 such that the second database 504 can be a standalone database, or distributed in combination with the database 100. The disclosed RSD schema supports distributed database environments. That is, an associated RSD sub-file can be generated for each distributed portion of the overall database. The user can then retrieve one or more sub-files depending upon the data that he or she wishes to access. It is to be appreciated that the RSD file, whether the file is one that represents the total database, or a sub-file that represents only a portion thereof in a distributed environment, may be generated depending upon the access rights of the user. For example, if the user has low-level access rights, and requests access to the database, the tool can automatically generate an RSD file that only represents that portion of the database that would be accessible to the user had the user been connected to the database under normal conditions. Similarly, if the user has high-level rights (i.e., global or administrative-type access), the tool can automatically access the user profile to determine that the RSD file to be generated will represent all aspects of the database that the user could access under normal conditions.

In the context of a classifier operating in conjunction with the disclosed architecture, the classifier can be employed to automatically learn and anticipate which users should have an RSD file generated for ready access, and how much of the database to use for generating the file. For example, as the database 100 is repeatedly accessed over time, the classifier can track the access behavior of the particular users. Thus, when the database activities, or other triggering criteria trigger auto-regeneration of the RSD file, the classifier can auto-regenerate an RSD file for each of the anticipated users. If a high-level employee routinely accesses the database for financial information on Friday evening at 9 PM, the classifier can learn this and have the most recent RSD schema representation ready in file format at that time for access by the employee.

In another scenario, if the classifier detects that Monday morning is a very active time for database accessing by employees, the classifier can learn this and prepare more recent RSD file regenerations at the early times of the morning. In this same context, if the classifier is programmed to include a fixed number of people in a process, for example, all managers attending an upcoming meeting at 10 AM, the classifier can anticipate and have prepared for delivery, or even deliver to the each manager via e-mail, an RSD file that reflects the existing state of the database such that all managers are working from the same "copy" of the database. These are but a few of the variations that can be employed in accordance with the disclosed architecture.

As indicated herein, the disclosed RSD schema also supports segmentation, where multiple physical units (files/resources) can be segmented and then combined into a single logical unit. Segmentation is designed to satisfy particular extension scenarios and to enable re-use of modular RSD components in multiple applications, as well as improving readability and manageability of the file. In some cases, the capability to segment files may impact the validation of the RSD file, particularly in the case of name references to structures which can be stored in another file segment.

Figure 6:
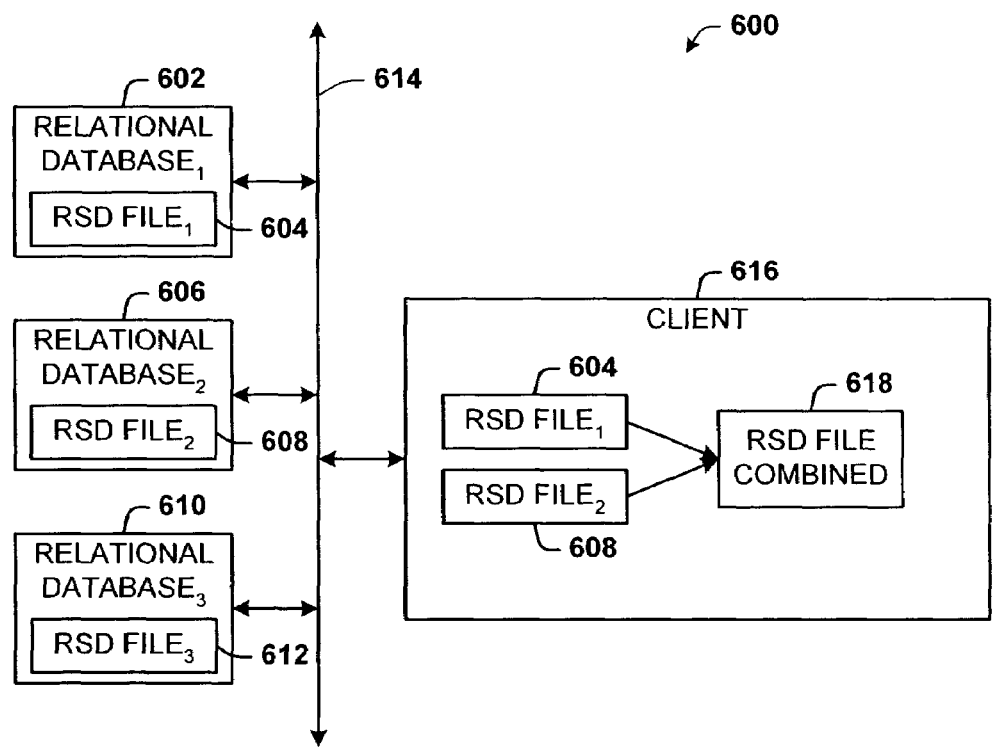
FIG. 6 illustrates a block diagram of a distributed system where multiple relational databases each have respective RSD files that when retrieved can be combined provide a more comprehensive view of the overall database.

Referring now to FIG. 6, there is illustrated a block diagram of a distributed system 600 where multiple relational databases that comprise an overall database each have respective RSD files that when retrieved can be combined to provide a more comprehensive view of the overall database. There is provided a first database 602 and associated first RSD file 604, a second database 606 and associated second RSD file 608 and, a third database 610 and associated third RSD file 612. The databases (602, 606, and 610), disposed on a wired or wireless network 614, can be accessed by a client 616, such that the client 616 retrieves the one or more of the respective RSD files (604, 608, and 612) for processing either online or offline. Here, the client 616 has retrieved the first RSD file 604 and the second RSD file 608 for use in further processing. The client 616 can process these files (604 and 608) separately, or combine the files (604 and 608) into a single RSD file 618 for overall processing.

If the user has made any changes to the single file 618, this can be propagated back to the respective relational databases whereby the single file 618 is segmented back into its constituent files (RSD file 604 and RSD file 608) and transmitted separately back to respective databases (602 and 606) for merging thereinto. It is further to be appreciated that only the RSD file that incorporates the changes may need to be transmitted back for merger with the existing database.

The client 616 may also be running separate applications such that each application runs only one of the data files. For example, if the client were running two different applications, a first application could retrieve and process the first RSD file 604, and the second application could retrieve and run the second RSD file 608. Thus, the two RSD files (604 and 608) need not be combined for processing at the client. Of course, in a disconnected environment, the RSD files (604 and 608) could be stored on the client 616 for later processing, and then uploaded to the respective databases (602 and 606) when reconnected to the network 614.

Note that RSD can store much more than a single database, where database is defined as a "catalog" in the ANSI SQL standard. The RSD by itself can store one to many catalogs (essentially separate schemas that are accessible via the same application connection) that make up a single database instance. However, when combined with a DataLocationPolicy concept, the RSD can expose a "logical instance" which transcends the boundaries of a single physical server and allows the RSD to represent an entire network of database instances, where logical database structures (tables/rows) are bound to physical locations (the server/catalog/schema/table) at runtime based on application logic and/or a policy file.

RSD Language

Where mapping is concerned, the RSD schema is a logical view of the metadata required to perform efficient mappings and provides the following: sufficient metadata about the relational domain to allow the CQR (common query runtime) engines to efficiently generate and/or execute CRUD (Create, Read, Update, and Delete) operations against the database based on actions performed in the target domain; easily readable; easily editable; capability to segment the RSD file to improve manageability and allow logical extensions to the relational schema; and capability to describe any ANSI relational database. When a query is presented through, e.g., XML, the CQR engine compiles the query into QIL (Query Intermediate Language), optimizes it, and generates SQL statements that can be run against the database.

Since the database name, schema name, and structure names are already separated in the RSD format by XML tags, RSD does not require (or allow) SQL escaping of names in the file format. This means that if names are specified with bracket-escaping, the brackets will be treated as literals in the structure name. In order to prevent potential security holes, RSD users should escape the names of all identifiers in the RSD file. However, this is an implementation detail, in that a generic name validation engine can be built that could accept platform-specific rule sets to describe the name escaping rules of a particular platform. If multiple backends are used, the capability to plug in an escaping/validation module to the compilation process is provided.

Since RSD is intended to be database independent, the RSD architecture only imposes naming constraints to ensure that name references within the CQR framework are unambiguous. RSD identifier names are escaped in name references (but not in declarations) in the following cases: where a "." is present anywhere in the identifier; where it starts with a "$" character; and a " " (white space) is present (in relationships only).

With respect to name uniqueness in RSD, structure identifier names (e.g., Tables, Custom Tables, Views, StoredProcedures, and UserDefinedFunctions) belong to the same namespace and must be globally unique within the logical RSD (the union of all the physical segments). The Custom Tables mapping feature is described in greater detail hereinbelow. Note, however, that these are implementation details specific to SQL Server. These name validations could follow different rules in a different database management system.

For validation specific to SQL Server, the following rules apply. Structures (e.g., Tables, Views, UserDefinedFunctions, StoredProcedures, and CustomTables) have a unique 3-part name within the scope of the logical RSD. For stored procedure naming in SQL Server, on file generation, the number for the stored procedure is concatenated to the name of the procedure using the canonical SQL format spName;number. On file generation, if the number is "1", the generating code can omit the semi-colon and the number. However, if the user later adds an SP by hand using the name;1, this results in a duplicate name exception being thrown while the file is loaded (i.e., spName=spName;number).

Relationships are a superset of the foreign key constraints that are stored in the database and can also represent relationships that are enforced by triggers, the business logic, or any other means. Relationships can be specified across databases within the RSD and have a unique name within the scope of the database that contains them.

Two more validation rules specific to SQL Server are AliasTypes and PrimaryKeys. AliasTypes has a unique 1-part name within the scope of the database in which they are defined, and are not referenced across databases. PrimaryKeys has a unique 1-part name within the scope of the database in which they are defined.

Columns has a unique name within the scope of the Table to which they belong.

Parameters has a unique name within the scope of the Routine (Stored Procedure or UDF) to which they belong.

If any of the syntactic or semantic constraints are violated, the system throws an exception that at a minimum, lists the filename/url, structure type (Table, Relationship, etc.) and the nature and/or root cause of the error. In more robust implementations, a listing of the line numbers in the persistent RSD format that contain RSD language constructs that are causing the errors can be provided. Furthermore, a listing of all the syntactic and semantic errors in one exception (or allowing the user to iterate through a list of exceptions) can also be provided to help speed the debugging process.

In some cases, multi-part names are used to reference structures, relationships, and types either within the RSD or from the MSD (Mapping Schema Definition) architecture, in which case escaping may be required if the name does not conform to the RSD naming guidelines.

Within the RSD architecture, file names can be referenced by other structures. The references that are possible are the following. Relationships can reference Tables or CustomTables using 1-, 2-, or 3-part names. For a 1-part name, the table name is resolved using the database that contains the Relationship and the Default Schema. Since relationships are not stored in the context of a schema, they do not have a "current" schema. For a 2-part name, the table name is resolved using the database that contains the Relationship. For a 3-part name, the table name is specified explicitly.

Alias types can be referenced from Columns or Parameters using a 0-part name. Names are resolved using the current (parent) database for the structure that contains the Column or Parameter to resolve the name. AliasTypes cannot be referenced across databases.

CustomTables has command instances that can reference other RSD structures using 1-, 2- or 3-part names. For a 1-part name, the structure name is resolved using the current database and the current schema. For a 2-part name, the structure name is resolved using the current database. For a 3-part name, the structure name is specified explicitly.

With respect to RSD reference validation, name references resolve to valid structures in the logical RSD, although they may be stored in separate physical segments. The one exception is Relationships that does not attempt to validate the remote end of the Relationship, if the structure is not available.

When referencing elements in the RSD domain from a mapping file of the mapping component, default attributes are used on the database and schema to resolve 1-part and 2-part names to fully-qualified names. References from the mapping file to the RSD file take place within the scope of a DataSource.

All references from the MSD to the RSD structures/relationships need to be valid in the logical RSD that is in scope for a particular logical mapping.

Case-sensitivity of name references depends on the "CaseSensitive" property in the RSD. Name references within the RSD and, from the MSD to the RSD are treated as case-sensitive. The implication is that authors should avoid name mismatches, but it allows the representation of all structures from all case-sensitive as well as case-insensitive database instances.

Using namespaces avoids name clashes (i.e., situations where the same tag name is used in different contexts). For instance, a namespace can identify whether an address is a postal address, an e-mail address, or an IP address. Tag names within a namespace must be unique.

There are some SQL Server specific elements in this namespace, so that SQL is treated as a first class citizen in the mapping framework, but none of the SQL specific elements are required so as not to preclude the RSD from describing other DBMS (Database Management System) platforms, as well by including other namespaces.

In the event that a loading component encounters validation errors it caches the information and continues processing in order to return a comprehensive list to the user of the problems with the file, rather than performing 1-off debugging. XML syntax and schema exceptions halt processing.

RSD Format

The XSD for RSD is the implementation of the following description of the RSD format.

1. Databases

This is the root tag of the RSD file, and represents zero or more of the databases that can be accessed with a single connection. The DatabaseCollection element is referenced by the DataSource in the mapping file by pointing to the file or files that define the Databases element.

| Tag | Card | Comment |
| --- | --- | --- |
| Attributes | | |
| DefaultDatabase | Opt | Must be the name of a Database element within the Databases. If no default is specified by the user, it will be the first database in the Databases. Used to enable 2-part naming. |
| Product | Opt | |
| Version | Opt | |
| CaseSensitive | Opt | Can be "true" or "false". Default is "false". |
| Sub-Elements | | |
| Database | 0+ | Container for the databases that belong to the collection |

Validation

If either @Product or @Version is not set to one of the allowable values, the loading code throws an exception notifying the user of the allowable values.

EXAMPLE

```
<rsd:Databases Product="SQL Server" Version="Yukon"
CaseSensitive="false" DefaultDatabase="Northwind">
    <rsd:Database Name="Northwind">
    ...
    </rsd:Database>
</rsd:Databases>
```

2. Database

This element represents a logical database within the context of a single instance.

| Tag | Card | Comment |
| --- | --- | --- |
| Attributes | | |
| Name | Req | Database name |
| DefaultSchema | Opt | Must be the name of a Schema element within the database. If no default is specified by the user, it will be the first Schema in the Database. Used to enable 1-part naming |
| Sub-Elements | | |
| AliasTypes | 0-1 | Container for the AliasTypes in this Database |
| Relationships | 0-1 | Container for the relationships in the RSD. All relationships are at the Database level in the file in order to provide quick editing in the logical extensions case and to provide a single location for the user to view all relationships |
| Schemas | 0-1 | Container for the Schema elements in the Database |

EXAMPLE

```
<rsd:Database Name="Northwind" DefaultSchema="dbo">
    <rsd:AliasTypes>
    ...
    </rsd:AliasTypes>
    <rsd:Schemas>
    ...
    </rsd:Schemas>
</rsd:Database>
```

3. AliasTypes

This element serves as a container for one or more AliasType elements.

4. AliasType

This represents a user-defined data type in the database. With regard to RSD generation, AliasTypes are bound to named defaults in the database using an sp_binddefault procedure, rather than specifying the default value in the argument list of an sp_addtype procedure. However, the tool that generates RSD files resolves the value of the global default and includes it inline in the AliasType definition.

| Tag | Card | Comment |
| --- | --- | --- |
| Attributes | | |
| Name | Req | The name of the data type user created |
| NullType | Opt | Can be 'NULL' or 'NOT NULL'. Default is 'NULL' |
| Sub-Elements | | |
| AliasTypes use the same representation for types that are used for columns. | | |
| DbStringType | 1 | Represents string types in the database |
| DbNumericType | 1 | Represents numeric types in the database |
| DbDateType | 1 | Represents date types in the database |
| DbGuidType | 1 | Represents GUIDs in the database |
| Default | 0-1 | Contains the default value to be used for this AliasType. If a column references an AliasType, the Default for the AliasType |

| Tag | Card | Comment |
|---|---|---|
| | | -continued |
| | | is applied to the column unless the column overrides the default value with its own Default. |

Validation

If the NullType is not one of the allowable values, an exception is thrown which alerts the user of the allowable values. For type validation, see Column.

EXAMPLE

```
<rsd:AliasType Name="phoneFld" NullType="Not Null" >
    <DbStringType Name="varchar" Length="15"/>
    <Default>(555) 555-5555</Default>
</rsd:AliasType>
```

5. Relationships

This element serves as a container for zero or more Relationship elements.

6. Relationship

Relationships in the RSD file can represent relationships that are implemented via foreign keys, triggers or logical relationships (by value).

| Tag | Card | Comment |
|---|---|---|
| Attributes | | |
| Name | Req | Relationship names must be unique within the context of Database. When relationships are referred to from the RelationshipMap they are qualified by the Database/@Name so that they can be uniquely identified within an entire RSD. |
| From | Req | The name of the parent table for this Relationship. |
| To | Req | The name of the child table for this Relationship. |
| CascadeDelete | Opt | Can be "Server", "Explicit", or "None". Default is "None". |
| CascadeUpdate | Opt | Can be "Server", "Explicit", or "None". Default is "None". Analogous to CascadeDelete. |
| Cardinality | Opt | Can be "OneToOne" or "OneToMany". "OneToMany" is the default. |
| IsLogical | Opt | Can be "true" or "false". Default is "true". |
| Sub-Elements | | |
| ColumnJoin | 1+ | Each ColumnJoin refers to a pair of columns. One column on the local table and one on the child table (related table). |

CascadeDelete and CascadeUpdate

CascadeDelete and CascadeUpdate introduce a new enumeration for how the central processor (CP) and the Domain adapters (XmlAdapter and ObjectSpace) interpret relationships. "None" means there is no Cascade and the parent is deleted. If any children are present, this results in a runtime error, if constraints are enforced in the database. An "Explicit" option is selected when the user does not have triggers on the back-end database, and wants the CP to remove all the children by executing a set-based DML statement explicitly before deleting the parent. A "Server" option is identical to "None" for the CP, but alerts the Domain adapters to update their cache based on the fact that the cascade has taken place on the server, using triggers or a foreign key on the backend.

IsLogical

This annotation is used by the user when creating a relationship that is not enforced via primary keys. "Server" is still valid when IsLogical is TRUE, and the assumption is that the cascade is implemented via triggers. IsLogical is also a signal to the RSD Generator.

RSD Generation Notes

Applications that generate RSD must set IsLogical to FALSE even though the default is true. When foreign keys in the database are surfaced as Relationships, the corresponding Cascade rules must be either Server or None. When the RSD file is generated, only the relationships that are implemented via foreign keys are listed in the file. The user must add in relationships that are specified via triggers or in the business logic. Applications that generate the RSD do not return "disabled" Foreign Key constraints. RSD generators preserve Relationships marked IsLogical when refreshing from the database.

EXAMPLE

```
<rsd:Relationships>
    <rsd:Relationship Name="Northwind.FK_Customer_Order"
    From="Northwind.dbo.Customers"
    To="Northwind.dbo.Orders"
    CascadeDelete="false" CascadeUpdate="true"
    ForeignKey="true">
        <ColumnJoin Column="CustomerID"
        RelatedColumn="CustomerID"/>
    </rsd:Relationship>
    <!-- An FK relationship -->
    <rsd:Relationship Name="myProduct_OD"
    From="Northwind.dbo.Products"
    To="Northwind.dbo.[Order Details]"
    CascadeUpdate="true" >
        <ColumnJoin Column="ProductID"
        RelatedColumn="ProductID"/>
    </rsd:Relationship>
    <!-- A logical relationship -->
</rsd:Relationships>
```

7. ColumnJoin

This element is used to refer to a two-column relationship previously defined. These are two columns on two different tables that are matched to represent a foreign key constraint.

| | Attributes | |
|---|---|---|
| Tag | Card | Comment |
| Column | Req | The name of column on our table. |
| RelatedColumn | Req | The name of column on the parent table. |

8. Schemas

This element serves as a container for zero or more Schema elements.

9. Schema

The Schema element serves as a grouping mechanism for the relational structures stored in the RSD.

Attributes

| Tag | Card | Comment |
|---|---|---|
| Name | Req | Schema name. |

Sub-Elements

The Schema element can also contain any of the following elements that represent relational structures. Each of the elements below is optional.

| Tag | Card | Comment |
|---|---|---|
| Tables | 0-1 | Contains definitions of one or more Tables in the database. |
| CustomTables | 0-1 | Contains definitions of one or more CustomTables |
| Views | 0-1 | Contains definitions of one or more Views in the database. |
| StoredProcedures | 0-1 | Contains definitions of one or more Stored Procedures in the database. |
| UserDefinedFunctions | 0-1 | Contains definitions of one or more UserDefinedFunctions in the database. |

EXAMPLE

```
<rsd:Database Name="Northwind" DefaultSchema="dbo">
    <rsd:Schemas>
        <rsd:Schema Name="dbo">
            <rsd:Tables>
            ...
            </rsd:Tables>
            <rsd:CustomTables>
            ...
            </rsd:CustomTables>
            <rsd:Views>
            ...
            </rsd:Views>
            <rsd:StoredProcedures>
            ...
            </rsd:StoredProcedures>
            <rsd:UserDefinedFunctions>
            ...
            </rsd:UserDefinedFunctions>
        </rsd:Schema>
    </rsd:Schemas>
</rsd:Database>
```

10. Tables

This element serves as a container for zero or more Table elements.

11. Table

This element represents a table in the underlying database.

| Tag | Card | Comment |
|---|---|---|
| Attributes | | |
| Name | Req | The name of the table. |
| Sub-Elements | | |
| Columns | 1 | Container for columns on this table |
| Constraints | 0-1 | Container for constraints on this table |

RSD Generation Notes

By default, RSD Generators does not return System Tables. The RSD Generator can provide a switch to allow the user to explicitly request system tables.

EXAMPLE

```
<rsd: Table Name="Customers">
    <rsd:Columns>
    ...
    </rsd:Columns>
    <rsd:Constraints>
    ..
    </rsd:Constraints>
</rsd:Table>
```

12. CustomTables

CustomTables is a container element for zero or more CustomTable elements. CustomTables is treated just as like any other structure in the database. See the Custom Tables specification hereinbelow.

RSD Generation Notes

Custom Tables are logical by definition and are preserved when the RSD file is re-generated from the database.

13. Views

This element serves as a container for zero or more View elements.

14. View

This element represents a relational view in the database. It is similar to the Table element.

| Tag | Card | Comment |
|---|---|---|
| Attributes | | |
| Name | Req | The name of the view. |
| Sub-Elements | | |
| Columns | 1 | The columns that defined the view are a restricted column type that only allow name and type to be specified. |

EXAMPLE

```
<rsd:View Name="myCustomerView">
    <rsd:Columns>
    ...
    </rsd:Columns >
</rsd:View>
```

Adding Primary Key Information to a View

The view, by definition, does not have a primary key. However, in order to update a view (user must implement INSTEAD OF triggers server side) or query the view in a relationship, a primary key is required. The user creates a CustomTable that is based on the view, optionally sets Auto-Commands to TRUE if the engines are chosen to generate commands automatically, and specifies the key columns in the CustomKey element on the CustomTable.

15. StoredProcedures

This element serves as a container for zero or more StoredProcedure elements.

16. StoredProcedure

This element represents a Stored Procedure in the database.

| Tag | Card | Comment |
|---|---|---|
| Attributes | | |
| Name | Req | The name of the Stored Procedure. See the naming rules hereinabove for details. |
| Sub-Elements | | |
| Parameters | 0-1 | Container for parameters of this stored procedure. |

EXAMPLE

```
<rsd:StoredProcedure Name="sp_Insert_Order">
    <rsd:Parameters>
    ...
    </rsd:Parameters>
</rsd:StoredProcedure>
```

17. UserDefinedFunctions

This element serves as a container for one or more UserDefinedFunction elements.

18. UserDefinedFunction

This element represents a User Defined Function (UDF) defined in the database.

| Tag | Card | Comment |
|---|---|---|
| Attributes | | |
| Name | Req | The UDF name. |
| Sub-Elements | | |
| Columns | 1 | This is a restricted Column type that only allows the name and the type of the column to be specified. It does not allow additional annotations such as AutoIncrement, Default, etc. The columns describe the result set that is returned from the UDF. |
| Parameters | 0-1 | Container for parameters of this stored UDF. |

EXAMPLE

```
<rsd:UserDefinedFunction Name="udf_get_Customers">
    <rsd:Columns>
    ...
    </rsd:Columns>
    <rsd:Parameters>
    ...
    </rsd:Parameters>
</rsd:UserDefinedFunction>
```

19. Columns

This element serves as a container for one or more Column elements.

20. Column

This element represents a Column in a table. A slightly more restrictive version of the xsd:type defined below that allows only @Name and type information can be used to describe the columns of a view, custom table, and result set from a UDF.

| Attributes | | |
|---|---|---|
| Tag | Card | Comment |
| Name | Req | Column name |
| AutoIncrement | Opt | Can be "true" or "false". "false" is the default. |
| AllowDbNull | Opt | Can be "true" or "false". "false" is the default. |
| ReadOnly | Opt | Can be "true" or "false". "false" is the default. |

Sub-Elements

Types are now represented as sub-elements rather than attributes. This allows more flexibility in customizing the types that can be expressed using the RSD and does not require continued adding of more and more attributes at the column level that are only used in particular contexts.

| Tag | Card | Comment |
|---|---|---|
| DbStringType | 1 | Represents string types in the database |
| DbNumericType | 1 | Represents numeric types in the database |
| DbDateType | 1 | Represents date types in the database |
| DbGuidType | 1 | Represents GUIDs in the database |
| DbXmlType | 1 | Represents the XML datatype in the database |
| DbUDTType | 1 | Represents the UDT type in the database |
| DbAliasType | 1 | Represents AliasTypes in the database |
| Default | 0-1 | Contains the default value to be used for this column. Default will be used by CP to insert the Default value on an Insert operation. |

Validation

AutoIncrement can only be set to TRUE if the type is one of the integer types (see below) or one of the exact decimal types and the scale is set to zero. AutoIncrement and AllowDbNull cannot both be TRUE. AutoIncrement and Computed cannot both be TRUE.

If any of the constraints above are violated, the user will receive an error message giving the three-part name of the structure, as well as the type (table, view, custom table, etc.) and the offending column name. A description of which constraint was violated is also included.

EXAMPLE

```
<rsd:Table Name="Customer">
    <rsd:Columns>
        <rsd:Column Name="CustomerID" AutoIncrement="true">
            <rsd:DbNumericType Name="Int"/>
        </rsd:Column>
        <rsd:Column Name="CompanyName">
            <rsd:StringType Name="Varchar" Length="40"/>
        </rsd:Column>
    </rsd:Columns>
</rsd:Table>
```

21. Parameters

This element serves as a container for zero or more Parameter elements.

22. Parameter

This element is used to represent a parameter to a Stored Procedure or UDF. Cursor output parameters are not supported.

Attributes

| Tag | Card | Comment |
| --- | --- | --- |
| Name | Req | Parameter name. |
| Direction | Opt | Can be "In", "InOut", or "Out". "In" is the default. |

Sub-Elements

Parameters use the same representation for types that are used for columns (See above).

| Tag | Card | Comment |
| --- | --- | --- |
| DbStringType | 1 | Represents string types in the database |
| DbNumericType | 1 | Represents numeric types in the database |
| DbDateType | 1 | Represents date types in the database |
| DbGuidType | 1 | Represents GUIDs in the database |
| DbXmlType | 1 | Represents the XML datatype in the database |
| DbUDTType | 1 | Represents the UDT type in the database |
| DbAliasType | 1 | Represents AliasTypes in the database |
| Default | 0-1 | Contains the default value to be used for this parameter. This is the value that will be passed to the parameter when the containing procedure is executed with the default |

RSD Generation Notes

RSD Generators should not return Procedures with VARYING parameters, since cursor output parameters are not supported.

EXAMPLE

```
<rsd:StoredProcedure Name="sp_UpdateCustomer">
    <rsd:Parameters>
        <rsd:Parameter Name="PrevCustomerID">
            <rsd:DbNumericType Name="Int" />
        </rsd:Parameter>
        <rsd:Parameter Name="CustomerID">
            <rsd:DbNumericType Name="Int" />
        </rsd:Parameter>
        <rsd:Parameter Name="CompanyName">
            <rsd:DbNumericType Name="varchar" Length="40" />
        </rsd:Parameter>
    </rsd:Parameters>
</rsd:StoredProcedure>
```

23. DbStringType

Attributes

| Tag | Card | Comment |
| --- | --- | --- |
| Name | Req | Type name (see above) |
| Length | Req | Can be an integer or "max" (case-insensitive). |

Validation

For SQL Server, the types represented by DbStringType are: char, nchar, varchar, nvarchar, text, ntext, binary, image and varbinary. The types text, ntext, and image do not support the length attribute—the other types require it. "max" can only be specified when the product="SQL Server" and the version="Yukon". Unicode columns (except ntext) cannot have a length value greater than 4000. Non-unicode columns (except text) cannot have a length value greater than 8000.

If any of the above constraints are violated, the user receives an error message that specifies the 3-part name of the structure, as well as the type and the offending column name. In addition, a description of the constraint is presented.

24. DbNumericType

For SQL Server, the types represented by DbIntegerType are: bit, tinyint, smallint, int, bigint, smallmoney, money, smallmoney, numeric, decimal, float, and real.

Attributes

| Tag | Card | Comment |
| --- | --- | --- |
| Name | Req | Type name |
| Precision | Opt | The total number of digits in a numeric type. Default is 0. |
| Scale | Opt | The number of digits to the right of the decimal. Default is 0. |

Validation

Precision is only defined for the decimal types: numeric, decimal, float, real. Scale is only defined for the exact decimal types: numeric, decimal.

If any of the above constraints are violated, the user receives an error message that specifies the 3-part name of the structure, as well as the type and the offending column name. In addition, a description of the constraint is presented.

25. DbDateType

For SQL Server, the types represented by DbNumericType are: Date, Time, UtcDateTime, SmallDateTime, and DateTime. Date, Time and UtcDateTime are new types in Yukon and are specified more thoroughly in the Yukon Primitive Types specification.

Attributes

| Tag | Card | Comment |
| --- | --- | --- |
| Name | Req | Type name (see above) |
| ParseFormat | Opt | This is for string types that are mapped to the new Date types. If they are stored in the target in non-canonical format the user can specify a parse format to allow the CQR to instantiate a SQL Date type from the string. Default is the canonical format for date serialization. |

Additional Validation

The ParseFormat is one of the values recognized by the System.Globalization.DateTimeFormatInfo type, that controls formatting for the System.DateTime type in the BCL.

If any of the above constraints are violated, the user receives an error message that specifies the 3-part name of the structure, as well as the type and the offending column name. In addition, a description of the constraint is presented.

26. DbGuidType

| Attributes | | |
|---|---|---|
| Tag | Card | Comment |
| Name | Req | Type name |

Validation

For SQL Server, the types represented by DbGuidType are uniqueidentifier and timestamp/rowversion.

If any of the above constraints are violated, the user receives an error message that specifies the 3-part name of the structure, as well as the type and the offending column name. In addition, a description of the constraint is presented.

27. DbXmlType

For SQL Server the types represented by DbXmlType are xml.

| Attributes | | |
|---|---|---|
| Tag | Card | Comment |
| Name | Req | Type name |

28. DbUDTType

For SQL Server, the types represented by DbXmlType are User-defined UDTs (Date, Time, and UtcDateTime are represented by the DbDateType above).

| Attributes | | |
|---|---|---|
| Tag | Card | Comment |
| Name | Req | Type name |

29. DbAliasType

For SQL Server, the types represented by DbAliasType are user-defined UDDTs (SQL2000 UDTs) such as phonefield.

| Attributes | | |
|---|---|---|
| Tag | Card | Comment |
| AliasName | Req | The name of the user-defined alias type. Must be defined in the RSD in the scope of the same database as the column. Only a one-part name is required. |

Validation

If the AliasType is not in the scope of the file, the validation is specified by the segmentation specification.

Default

This element contains the text that represents a value to be used as default for Columns, Parameters, UDTs, etc. It can contain a scalar value or an expression using built-in or user defined scalar valued functions.

EXAMPLE

<Default>Seattle</Default>

30. Constraints

This element serves as a container for the primary key, and the alternate keys, as well as that which can be represented by UniqueConstraints in the database or constraints on a particular table.

| Sub-Elements | | |
|---|---|---|
| Tag | Card | Comment |
| PrimaryKey | 0-1 | A table may have a primary key. At most one is allowed. Primary key can be defined on a set of columns. The PrimaryKey element will refer to these columns. |
| AlternateIdstructure | 0-1 | This is a logical (user-supplied) element which defines a set of columns which uniquely identify a row in the table without using that table's primary key |

31. PrimaryKey

This element represents a Primary Key for a table. It is always defined in the context of a Table. It references the column(s) that define a primary key for this table.

| Tag | Card | Comment |
|---|---|---|
| Attributes | | |
| Name | Req | Constraint name. |
| Sub-Elements | | |
| ColumnRef | 1+ | Each ColumnRef refers to a column that is a part of this primary key. |

32. AlternateIdentity,

AlternateIdentity is used by the BulkLoad upsert feature. The columns defined by the AlternateIdentity constraint can be used to uniquely identify a row in a table without making use of the PrimaryKey.

| Sub-Elements | | |
|---|---|---|
| Tag | Card | Comment |
| ColumnRef | 1+ | Each ColumnRef identifies a single column on the current table that is part of the AlternateIdstructure for that table |

RSD Generation Notes

AlternateIdentity is logical by default and must be preserved by RSD Generators when they refresh from the database.

33. ColumnRef

This element is used to refer to a column previously defined, and is used to refer to columns from constraints, etc.

| Attributes | | |
|---|---|---|
| Tag | Card | Comment |
| Name | Req | The name of a column that belongs to the parent Table that contains the PrimaryKey element. |

Custom Tables

The Custom Tables feature is a mechanism whereby the user can support database operations as a means to make up a logical table. The user can perform transformations on the physical data when reading or writing from the database. Custom Tables enables the capability to map fields from the target domain to Commands (stored procedures, user-defined functions or inline SQL statements) on the relational DataSource. This keeps mapping itself simple and unaffected by relational-specific things. Custom Tables provides an abstraction to mapping that allows commands in the database to be mapped to just as if they were physical tables, in most cases. Specifying this abstraction at the RSD level allows the user to deal with relational-specific concepts using relational terminology, rather than attempting to use domain-independent terminology at the mapping level.

For example, columns already exist in the relational domain. Custom Tables provides a CustomTable element where columns can be added just as in normal RSD Tables. This also helps keep mapping from becoming cluttered, and optimizes the solution by not introducing more places where the user must go to wire up the pieces.

Scenarios for Custom Tables include the following.

Adding a Condition to a Table/View. In this scenario, the user wants to add a filter to the base table. The canonical example is for the single table object-inheritance scenario where Person, Employee, Manager, etc., are all mapped to the same table and the user wants to filter the table based on the 'type' column. The user can specify a condition so that each type is mapped to its own table.

Add/Override Primary Key. Views by default do not have primary keys, but in order to use them effectively within the framework, a primary key field(s) must be defined on all structures. In order to achieve this, the user can create a simple Custom Table to specify the key field(s) on a view. The user can employ this same functionality to override the primary key on the underlying table or apply a virtual key to a procedure.

SingleComplexMapping. The user uses normal table mapping, but is faced with a limitation in mapping. To get around this, the user creates a one-off custom table. This scenario is distinct as the user only uses custom tables in limited areas and they should be able to use these in combination with normal physical table mapping.

Examples of this type of scenario include additional read-only columns on a UDF for Query, and additional write-only columns on an Update or Insert (userid, time updated, client-side calculated values, etc.).

ReadOnlyTables. The user has access to tables for read-only, but must use stored procedures for CUD. In this scenario, the user wants to base the Custom Table on an existing physical table, but override the Insert, Update and Delete operations to use stored procedures.

All Stored Procedures. The user cannot access tables at all and must use stored procedures and/or UDFs for all database access. In this scenario, there is no physical table on which to base the custom table.

Existing stored procedures. The scenarios above need to account for the situation where the user does not have the ability to create custom User-Defined Functions or Stored-Procedures in the database to be used by the CQR engines and are forced to use existing stored procedures. For existing stored procedures, these may not be normally used as a unified CRUD set and shaping/naming may be different between each stored procedure. In general, existing stored procedures cannot be altered because other legacy applications will be using them. This may result in the user needing to write SQL to manipulate the results. The user may also want to use SQL to massage data when mapping significantly de-normalized tables.

Custom SQL. In this scenario, the user does not have a procedure on the server to implement CRUD operations, but desires to perform some type of advanced behavior, so the user is allowed to craft arbitrary SQL with some restrictions. Examples of this scenario include: custom shaping; calling scalar UDFs/UDT methods; and Inserting/Updating/Deleting data in multiple tables or tables other than the table that serves as the BasedOn for the CustomTable.

Custom Table Format

1. CustomTables Element For consistency with other RSD structures, the CustomTables element represents a container element for zero or more CustomTable types. CustomTables is a child of the Schema element. The implication of this is that custom tables are referenced in the Mapping file exactly like physical tables.

2. CustomTable Element

The CustomTable element is exposed to mapping as if it is a table, but under the covers it allows customization so that Insert, Delete, Update and Query commands can be overridden to come from various DB structures such as stored procedures, UDFs, or inline SQL statements as outlined below.

CustomTables fall into two main categories: BasedOn and Procedure Abstraction. BasedOn CustomTables are based on a physical table or view and generate one or more of their Commands automatically according to the definition of the BasedOn structure. Automatically-generated commands behave as if they were executed directly against the BasedOn structure. BasedOn CustomTables can still override individual commands. Procedural Abstraction CustomTables do not have any automatically generated commands and must have their Columns defined explicitly. The Columns serve as an abstraction for binding FieldMaps to parameters and/or Result columns.

| Tag | Card | Comment |
|---|---|---|
| Attributes | | |
| Name | Req | String representing the name of the CustomTable. Must conform to the structure naming and uniqueness rules (i.e., cannot share a 3-part name with any other structure in the RSD file). This name is referenced in a case sensitive manner to be consistent with other relational structures. |
| Sub-Elements The sub-elements are constrained by the following content model: | | |
| BasedOn | 0-1 | BasedOn references an existing Table or View. The BasedOn serves as the basis for the CustomTable's columns, relationships, and is used to auto-generate commands where appropriate. The relational structure that the CustomTable is BasedOn is resolved using one, two, or three part names. |
| Columns | 0-1 | Container elements for explicitly defined Columns in the Custom Table. By definition these columns are simply abstractions for procedure parameters or result columns so they only allow a name and a type to be specified. |

-continued

| Tag | Card | Comment |
|---|---|---|
| Condition | 0+ | This is meant to be a filter over the set that is exposed by the CustomTable. Condition can be used independently of the QueryCommand or in conjunction with the QueryCommand. If the predicate specified in the Condition can be composed with the QueryCommand, the CustomTable can be generated on the server, however in particular cases (Inline Commands, Stored Procedures) the predicate may be applied on the client. |
| QueryCommand | 0-N | Command instance for querying the source. Multiple QueryCommand scenario is multiple StoredProcedures or UDFs taking different parameter types but returning the same result set (e.g., sp_GetCustById, sp_GetCustByName, etc.). |
| InsertCommand | 0-1 | Command instance for inserting data into the source. |
| UpdateCommand | 0-1 | Command instance for updating data of the source. |
| DeleteCommand | 0-1 | Command instance for deleting data from the source. |
| CustomKey | 0-1 | This is the key that is used to uniquely identify relational instances. This is a logical key, and overrides any CustomKey defined by the structure that the Custom Table is BasedOn. If a CustomKey is not defined and the Custom Table is BasedOn a table with a PrimaryKey the CustomKey will automatically inherit the PrimaryKey. |

3. BasedOn Structure

Attributes

| Tag | Card | Comment |
|---|---|---|
| Name | Req | String representing the name of the relational structure that the CustomTable is BasedOn. BasedOn can only reference a Table or View using a 1, 2, or 3-part name. Since Tables and Views share a common namespace within a schema it is not necessary to have an additional type attribute. |
| AutoCommands | Opt | When set to true, allows the mapping framework to autogenerate SQL for Command instances that are absent. In the case of Views, it is assumed that the user has implemented the view with triggers if necessary appropriately on the server. When set to false, absent commands are treated as "disabled". Default is "false." |

Sub-Elements

There are no sub-elements for this type.

BasedOn Semantics

The BasedOn structure provides a shortcut so that the CustomTable can inherit its Column definitions from an existing structure rather than listing them explicitly. The BasedOn structure is used to automatically generate any Command instances that are not explicitly overridden by the user. A CustomTable that is BasedOn inherits the Relationships that are defined in the structure on which it is based. These Relationships can be referred to by name in a RelationshipMap as if the CustomTable were the base relational structure.

BasedOn also gives the user control over the semantics of missing Command instances. When AutoCommands is "false" specific Command instances that are not explicitly overridden are "disabled".

4. Columns

There are two types of Columns: Columns that are inherited via BasedOn and Columns that are explicitly declared. BasedOn Columns are identical to the columns that are specified for a physical table or view, however the user will never actually see the syntax for these columns in the context of the Custom Table. The relevant point is that when AutoCommands is equal to true, the SQL that is generated is identical to the SQL that would be generated against the Base Table so the semantics of the additional annotations (such as default values, AutoIncrement, ReadOnly, and AllowDBNull must be preserved).

Explicit Columns are explicitly declared columns in the CustomTable, and are abstractions for a Command procedure parameters and/or result columns. Because these are not physical columns on a table, they do not allow additional annotations such as AutoIncrement, Read-Only, etc. They only allow a name and type. In cases where parameters to a routine are declared explicitly (Stored Procedures, UDFs) the type of the column is convertible to the type of the parameter. In the Inline case (no declarative parameters) the type of the column is assumed to be the type of the parameter.

If a BasedOn is also specified these Columns are appended to the BasedOn columns as "Extended Columns". Extended columns can simplify scenarios that fall into the "Single Complex Mapping" scenario where one (or more) commands may have more columns than the BasedOn structure. Any auto-generated commands use only the BasedOn columns, while Referenced or Inline commands use BasedOn columns plus the ExtendedColumns. It is up to the Command author to perform the appropriate bindings (if default binding is not sufficient).

5. Condition Element

The Condition element is a shorthand notation for a simple Inline QueryCommand with the additional property that the value used in the predicate is expressed declaratively in the syntax and can be exposed to the Target domain via the mapping interface. The scenario in particular that requires this functionality (aside from being a nice shorthand for the user) is an inheritance scenario where multiple types in an inheritance hierarchy map to the same physical table, and on read they want to map to a particular view of that table.

Attributes

| Tag | Card | Comment |
|---|---|---|
| Column | Req | This must be a column in the scope of the CustomTable on which this condition is applied |
| Value | Req | The literal value to add to the predicate |

Additional operators can be supported by adding an "Operator" attribute to the Condition with the "=" operator as the default for backwards compatibility. In addition, if multiple Conditions are specified they are combined using the AND operator.

6. Commands (Query, Insert, Update, Delete)

Commands are where the user can customize which relational structure or inline SQL is used to perform each of the CRUD operations. The structure of Commands assumes that the most common CustomTable scenarios will override CUD Command instance by referencing database procedures and/or functions (rather than inline SQL), "inlining" is a specialized behavior. InlineCommands are an optional child element of the other Command types to reduce confusion in the common case by separating metadata that only applies to the Inline scenario.

Query, Insert, and Update Commands can return Result Sets and Output Parameters. In order for OutputParameters to be surfaced in the target domain they must be bound to a custom table column that participates in a FieldMap. In the QueryCase, the value of the output parameter is copied to every row in the result set. Since Insert and Update only return at most one row in the Result Set the value of the output parameter is treated just like a column value.

Because Output Parameters are treated as though they are part of the row(s) being returned from the Command, a result column cannot bind to the same Custom Table Column as an Out or In/Out Parameter.

7. QueryCommand

| Tag | Card | Comment |
| --- | --- | --- |
| Attributes | | |
| DisableDefaultBinding | Opt | Can be "true" or "false". Default is "false". Users may want to disable default binding when they are using InlineCommands when the parameter or result sets are of a different width than the custom table or to make the file more explicit. |
| Sub-Elements | | |
| The sub-elements are constrained by the following content model: | | |
| CommandReference | 1 | String that represents the UDF referenced by this particular Command. |
| InlineCommand | 1 | Contains all the metadata required for defining custom SQL inline in the RSD file |
| ParameterBinding | 0-N | Represents the binding of a parameter to the parameter on the DB structure or inline SQL. Supports Default Binding |
| ColumnBinding | 1-N | Represent the binding of a CustomTable Column to the column returned from a DB structure or inline SQL command. Supports Default Binding. |

UDFs are supported, however they are treated as though they return the full set of children for all parents. It is simpler to allow UDFs with single-valued parameters but to allow a UDF that picks up a parameter from its parent (e.g., udf_getOrders(@cid)) is similar to full SP support for query.

8. Insert Command

| Tag | Card | Comment |
| --- | --- | --- |
| Attributes | | |
| ValidateHasResults | Opt | Boolean that defaults to "false". If "true" indicates that Insert and Update commands should error at runtime if anything other than exactly one row is returned in the result set of the command. If this is "false", then if the result set is present there can be zero or one rows in the result set. |
| DisableDefaultBinding | Opt | Can be "true" or "false". Default is "false". Users may want to disable default binding when they are using InlineCommands when the parameter or result sets are of a different width than the custom table or to make the file more explicit. |
| Sub-Elements | | |
| The sub-elements are constrained by the following content model: | | |
| CommandReference | 1 | String that represents the SP referenced by this particular Command. |
| InlineCommand | 1 | Contains all the metadata required for defining custom SQL inline in the RSD file |
| ParameterBinding | 0-N | Represents the binding of a parameter to the parameter on the DB structure or inline SQL. Supports Default Binding |
| ColumnBinding | 0-N | Represents the binding of a CustomTable Column to the column returned from a DB structure or inline SQL. Supports Default Binding |

9. UpdateCommand

UpdateCommand is specialized in that it allows for an UpdateableParameter binding, which further allows the user to determine whether they want the current or original version of the a custom table column value to be bound to a particular parameter (different versions of the same column can be bound to two separate input parameters).

| Tag | Card | Comment |
| --- | --- | --- |
| Attributes | | |
| ValidateHasResults | Opt | Boolean that defaults to "false". If "true" indicates that Insert and Update commands should error at runtime if anything other than exactly one row is returned in the result set of the command. If this is "false", then a result set is allowed but if it is present there can be zero or one rows in the result set. |
| DisableDefaultBinding | Opt | Can be "true" or "false". Default is "false". Users may want to disable default binding when they are using InlineCommands when the parameter or result sets are of a different width than the custom table or to make the file more explicit. |
| Sub-Elements | | |
| The sub-elements are constrained by the following content model: | | |
| CommandReference | 1 | String that represents the SP referenced by this particular Command. |
| InlineCommand | 1 | Contains all the metadata required for defining custom SQL inline in the RSD file |

-continued

| Tag | Card | Comment |
|---|---|---|
| ParameterBinding | 0-N | Represents the binding of a parameter to the parameter on the DB structure or inline SQL. Supports Default Binding |
| ColumnBinding | 0-N | Represents the binding of a CustomTable Column to the column returned from a DB structure or inline SQL. Supports Default Binding |

10. DeleteCommand

DeleteCommand does not return a Result set or output parameters, since there is nothing in the target domain to which to bind these values.

| Tag | Card | Comment |
|---|---|---|
| Attributes | | |
| DisableDefaultBinding | Opt | Can be "true" or "false". Default is "false". Users may want to disable default binding when they are using InlineCommands when the parameter or result sets are of a different width than the custom table or to make the file more explicit. |
| Sub-Elements | | |
| The sub-elements are constrained by the following content model: | | |
| CommandReference | 1 | String that represents the SP referenced by this particular Command. |
| InlineCommand | 1 | Contains all the metadata required for defining custom SQL inline in the RSD file |
| ParameterBinding | 0-N | Represents the binding of a parameter to the parameter on the DB structure or inline SQL. Supports Default Binding |

11. CustomKey Element

The CustomKey element defines a logical key over the columns on the CustomTable. The CustomKey is exactly the XSD type of the PrimaryKey from the RSD specification.

12. InlineCommand Element

The InlineCommand element allows the user to specify the SQL implementation for all four CRUD operations inline in the Body sub-element. The order of these elements is insignificant and should be ordered as they appear below.

| Tag | Card | Comment |
|---|---|---|
| Attributes | | |
| Type | Opt | InlineCommands allow both Sql Statements and Sql Batch. Since we do not parse the SQL we rely on the user to notify the engines which type the statement is. If the user incorrectly identifies the type of the statement it results in a runtime error. This attribute can be "SqlStmt" or "SqlBatch". The default is "SqlStmt". |
| Sub-Elements | | |
| Body | 0-1 | The SQL for the command. This is not parsed and will be passed through to the server as is. |

13. ParameterBinding

ParameterBinding represents the binding of a CustomTable column to a parameter on an StoredProcedure, UDF, or inline SQL. ParameterBindings are used for Query, Insert and Delete Commands

| | | |
|---|---|---|
| | Attributes | |
| Tag | Card | Comment |
| @Parameter | Req | Required string that represents the name of the parameter on the routine that is bound to the Custom Table column. |
| @Column | Req | Required string that represents the column on the CustomTable that is bound to the @Parameter parameter. |

Sub-Elements
There are no sub-elements.

14. UpdateableParameterBinding

Update Commands have parameters that can take an additional attribute called Version. Otherwise, the ParameterBinding and UpdateableParameterBinding are the same. Version is only applicable in the input direction, on output the value is bound to the column (as "original").

| | | |
|---|---|---|
| | Attributes | |
| Tag | Card | Comment |
| @Parameter | Req | Required string that represents the name of the parameter that is bound. |
| @Column | Req | Required string that represents the column on the CustomTable that is bound to the @Parameter parameter. |
| @Version | Opt | Optional enum that allows for "Original", "Current". Default is "Current". Represents if the value of the data as retrieved from the DB should be used or the newly updated data. |

Sub-Elements
There are no sub-elements.

15. ColumnBinding Element

ColumnBinding represents the binding of a CustomTable column to the column returned from a StoredProcedure/UDF/inline SQL Command, and is applicable to all command types.

| | | |
|---|---|---|
| | Attributes | |
| Tag | Card | Comment |
| @Result | Req | Required string that represents the column on the result set that is bound. |

-continued

| Tag | Card | Comment |
| --- | --- | --- |
| @Column | Req | Required string that represents the column on the CustomTable that is bound to the @Result column. |

Sub-Elements

There are no sub-elements.

Parameter & Column Binding Semantics

The Default Binding feature is intended to provide a syntactical shortcut to users so that when the names of the Custom Table column match with the underlying parameter and/or result column name then the system behaves as if the binding is present as a Parameter name=CustomColumn name binding or ResultColumn name=CustomColumn name binding. The Default Binding feature does not in any way alter the semantics of what it means for a parameter or column binding to be present (or absent) in any given scenario, but is simply a mechanism for attempting to infer the appropriate bindings. Default binding is on by default and can be disabled per command.

Default Binding with Explicit Metadata. When there is explicit metadata (compile-time information) for how many parameters or result columns should be expecting for a given command, the exact number of default bindings can be created up to the number of parameters or columns defined on the procedure or routine. The following table summarizes which command types for which explicit compile-time parameter/column information exists.

|  | Parameters | Column |
| --- | --- | --- |
| User-Defined Functions | Yes | Yes |
| Stored Procedures | Yes | No |
| Inline SQL | No | No |

When Default Binding is turned on, the mapping framework creates a binding for each column in the custom table to the appropriately named parameter and/or column in the command. When metadata is available, an explicit binding is assumed to be a partial binding, and the system will attempt to apply default binding to any remaining columns on the Custom table. For example, consider the CustomTable for Orders which is defined as (oid nchar(10), odate date, comments nvarchar(max)). The InsertCommand for the Orders table has been overridden to reference sp_OrderInsert(@orderid nchar (10), odate date, comments nvarchar(max)). With Default Binding turned on and no ParameterBindings explicitly specified, the mapping framework would generate two bindings: one for odate and one for comments. The user could then specify an explicit binding from oid to orderid so that all three parameters are bound.

Default Binding without Explicit Metadata. In cases where no declarative information about parameters and/or columns is available, the system will generate a parameter and a column binding for each column in the custom table. This may result in over-binding where there are more custom table columns than parameters in a procedure or columns in a result set.

Partial Binding is still supported in this scenario, so in every case where Default Binding has not been disabled there will be one parameter binding and one column binding for each column in the custom table.

The user can turn-off Default Binding explicitly and specify all of the bindings explicitly.

Binding Semantics

The expected behavior is capable of being defined when the custom table has more or less bindings than the input parameters to a procedure or the result columns to output parameters for a particular command. Where the CustomTable is wider than the Query Result Set, this scenario is designed to accommodate write-only fields (e.g., time of update, or userid doing the update). The mapped columns on the CustomTable that are referenced by a FieldMap, but not contained in the ResultSet, are treated as if the return is null. The target domain defines what the appropriate behavior is (null behavior for XML and default value form constructor in Objects).

UDF Scenario

In a UDF scenario, the appropriate number of columns is always selected from the UDF result set because compile time metadata allows formulation of queries properly. If the custom table is still wider than the UDF result set, the null behavior specified above will be executed.

Inline SQL Scenario

In this scenario if the user has disabled default binding and properly listed the columns to be returned from the SQL statement, the behavior is identical to the UDF scenario. If the user is relying on default bindings and the custom table is wider than the result set, columns are selected that do not exist resulting in a runtime error.

CustomTable Narrower than Query Result Set

In this scenario, the user is accessing a UDF or StoredProcedure that cannot be altered, but which returns values which are not being used in the customer's mapping application. This is not an error case, and the unbound/unmapped values are ignored.

This scenario is unlikely in the Inline case because only the result columns that are bound to custom table columns will be selected.

CustomTable Wider than Input Parameter Set for CUD

In the update case, Custom columns that are not bound to columns or parameters, are ignored. It is assumed that these are read-only fields and/or not required for execution of the command (particularly true for Delete commands which may only take the key).

In the Stored Procedure case, the number of parameters is always known and declared so over-binding never occurs. A compile time error can be provided if the user attempts to explicitly bind to a parameter that does not exist.

In the Inline SQL scenario, over-binding of the number of parameters that is used in the command may occur. This is not an error and may simply result in extra parameter values being sent across the wire.

CustomTable Narrower than Parameter Set

In this case the Command requires more parameters than are currently mapped from the user's application. If the Command has parameters that are not bound to any column on the Custom Table, or the Column on the Custom Table is not referenced by a FieldMap we will always pass the "default" to the Parameter. These parameters are outside the scope of the custom table.

In the StoredProcedure Scenario, it is known if the default keyword will be applied to a parameter that does not have a default declared, and thus, a compile time error can be issued notifying the user that there is an unbound parameter that has no default.

In the Inline SQL scenario, there is no capability to validate the fact that more parameters are declared in the command text so the user will receive a runtime error that there are unbound parameters in the command.

Additional Parameter Guidelines for CUD

Insert Commands—when binding values to input parameters on InsertCommands, the CP must respect the setting of ForceNullOnInsert for the Map to the current CustomTable.

Update Commands—when binding values to the parameters in the command we will always bind all values even if they are unchanged rather than attempting to execute the procedure with the "default" keyword or null specified for that parameter.

Parameter Scoping in Inline Scenarios—if multiple instances are batched for execution on a particular Command, and the Command is Inline SQL, CP must account for the fact that there will be overlapping parameter names in the Command text.

CustomTable Narrower than CUD Result Set

In this scenario, the additional columns are simply ignored as they are in the Query case.

CustomTable Wider than CUD Result Set

In this case, only those values to the target domain for which has been returned in the CUD Command's result set, are bound back.

Scenario Examples

Simple Condition

RSD file:

```
<Database Name="Northwind">
    <Schema Name="dbo">
        <CustomTables>
            <CustomTable Name="CustomerYTD">
                <BasedOn Name="Customers"
                AutoCommands="true"/>
                <Condition Column="ContactTitle"
                Value="Owner"/>
                <Condition Column="City"
                Value="Mexico D.F."/>
            </CustomTable>
        </CustomTables>
    </Schema>
</Database>
```

SingleComplexMapping

Suppose the user has an attribute on the Customer class that is Year-to-Date (YTD) sales for that customer. This must be calculated, as it is not stored on the Customer table. The user writes a parameterless UDF that returns all the customers with their YTD sales totals.

Using an ExtendedColumns feature, the Customers table is used as the BasedOn structure and then the salesYTD column is appended to the columns inherited from the Customers table. The QueryCommand then simply references the UDF (udf_CustomerWithYTD) which has been custom-built for mapping such that the columns returned in the UDFs resultset are named identically to the columns on the Customer table and the salesYTD column specified in the ExtendedColumns. This naming takes advantage of default column binding and precludes the need for explicit bindings. Since a UDF can be used as a subselect, predicates from OPath are supported as if this was an Auto Command type.

RSD file:

```
<Database Name="Northwind">
    <Schema Name="dbo">
        <CustomTables>
            <CustomTable Name="CustomerYTD">
                <BasedOn Name="Customers"
                AutoCommands="true"/>
                <ExtendedColumns>
                    <Column Name="salesYTD"
                    SqlType="Integer"/>
                </ExtendedColumns>
                <QueryCommand>
                    <CommandReference
                    Name="udf_CustomerWithYTD"/>
                </QueryCommand>
                <CustomKey
                Name="pk_Customers_logical" >
                <ColumnRef
                Name="customerid" />
                </CustomKey>
            </CustomTable>
        </CustomTables>
    </Schema>
</Database>
```

Mapping File

The mapping for this scenario looks like the following:

```
<m:MappingSchema
xmlns:m="http://schemas.microsoft.com/data/2002/09/28/mapping">
<m:DataSources>
    <m:DataSource Type="SQL Server" Direction="Source">
        <m:Schema Location="Northwind.rsd"/>
        <m:Variable Name="CustomerYTD" Select="CustomerYTD"/>
        <m:Variable Name="Orders" Select="Orders"/>
        <m:Relationship Name="R_CO1" FromVariable="CustomerYTD"
ToVariable="Orders">
            <m:FieldJoin From="CustomerID" To="CustomerID"/>
        </m:Relationship>
    </m:DataSource>
    <m:DataSource Type="Object" Direction="Target" >
        <m:InlineSchema
xmlns:o="http://schemas.microsoft.com/data/2002/09/20/extendedobjectschema">
            <o:ExtendedObjectSchema Name="northwindOBJ">
                <o:Classes>
                    <o:Class Name="Customer">
                        <o:Member Name="companyName" />
```

```
                <o:Member Name="customerName"/>
                <o:Member Name="customerID" IsKey="true"/>
                <o:Member Name="myOrders"/>
                <o:Member Name="YTDSales"/>
            </o:Class>
            <o:Class Name="Order">
                <o:Member Name="orderDate"/>
                <o:Member Name="freight"/>
                <o:Member Name="orderID" IsKey="true"/>
                <o:Member Name="myCustomer"/>
            </o:Class>
        </o:Classes>
        <o:ObjectRelationships>
            <o:Object Relationship Name="CustomerOrders" Type="OneToMany" ParentClass="Customer" ChildClass="Order" ParentMember="myOrders" ChildMember="myCustomer" />
        </o:ObjectRelationships>
      </o:ExtendedObjectSchema>
    </m:InlineSchema>
  </m:DataSource>
</m:DataSources>
<m:Mappings>
    <m:Map SourceVariable="CustomerYTD" TargetSelect="Customer">
        <m:FieldMap SourceField="CustomerID" TargetField="customerID"/>
        <m:FieldMap SourceField="CustomerName" TargetField="customerName"/>
        <m:FieldMap SourceField="CompanyName" TarqetField="companyName"/>
        <m:FieldMap SourceField="SalesYTD" TargetField="YTDSales"/>
    </m:Map>
    <m:Map SourceVariable="Orders" TargetSelect="Order">
        <m:FieldMap SourceField="OrderID" TargetField="orderID"/>
        <m:FieldMap SourceField="OrderDate" TargetField="orderDate"/>
        <m:FieldMap SourceField="Freight" TargetField="freight"/>
    </m:Map>
</m:Mappings>
</m:MappingSchema>
```

Insert, Update and Delete are Auto, and since their command instances @Select all point to the Customer table which does not include YTD, this field is not updated and no error is raised.

ReadOnlyTables—Custom-Built StoredProcedures (SPs)

In this example the user develops SPs as part of their application that are used for Insert, Update and Delete. Because the SPs are built specifically for mapping, they again take advantage of the default binding functionality by naming their parameters appropriately. In this scenario, the Stored Procedures do not return result sets. In addition, the CustomKey is inherited from the primary key definition that was placed on the Customers and Orders tables that serve as the BasedOn tables. The only difference between this example and the previous example is in the RSD CustomTables. Part of the power of the Custom Tables functionality is that the same Mapping is valid despite changes in the underlying DB structures that are used. For brevity only the RSD is shown here.

RSD File:

```
<Database Name="Northwind">
    <Schema Name="dbo">
        <CustomTables>
            <CustomTable Name="myCustomers">
                <BasedOn Name="Customers"
                    AutoCommands="true"/>
                <InsertCommand>
                    <CommandReference
                        Name="sp_CustomerInsert"/>
                </InsertCommand>
                <UpdateCommand>
                    <CommandReference
                        Name="sp_CustomerUpdate"/>
                </UpdateCommand>
                <DeleteCommand>
                    <CommandReference
                        Name="sp_CustomerDelete"/>
                </DeleteCommand>
            <CustomTable>
        <CustomTable Name="myOrders">
            <BasedOn Name="Orders"
                AutoCommands="true"/>
                <InsertCommand>
                    <CommandReference
                        Name="sp_OrderInsert"/>
                </InsertCommand>
                <UpdateCommand>
                    <CommandReference
                        Name="sp_OrderUpdate"/>
                </UpdateCommand>
                <DeleteCommand>
                    <CommandReference
                        Name="sp_OrderDelete"/>
                </DeleteCommand>
            <CustomTable>
        </CustomTables>
    </Schema>
</Database>
```

For an ALLSP scenario, this is the same as the above except that because there is no access to tables the Columns must be explicitly listed.

```
<Database Name="Northwind">
    <Schema Name="dbo">
        <CustomTable Name="myCustomers">
```

-continued

```
            <Columns>
                <Column Name="CompanyName"
                    SqlType="nvarchar" Length="20"/>
                <Column Name="CustomerName"
                    SqlType="nvarchar" Length="20"/>
                <Column Name="CustomerID"
                    SqlType="nvarchar" Length="10"/>
            </Columns>
            <QueryCommand CommandType="Existing"
Select="sp_CustomerQuery"/>
            <InsertCommand CommandType="Existing"
Select="sp_Customer Insert"/>
            <UpdateCommand CommandType="Existing"
Select="sp_CustomerUpdate"/>
            <DeleteCommand CommandType="Existing"
Select="sp_CustomerDelete"/>
            <CustomKey Name="mycust_pk">
                    <ColumnRef Name="CustomerID"/>
            </CustomKey>
        </CustomTable>
        <CustomTable Name="myOrders">
            <Columns>
                <Column Name="OrderDate" SqlType="datetime"/>
                <Column Name="Freight" SqlType="decimal"/>
                <Column Name="OrderID" SqlType="nvarchar"
                    Length="10"/>
            </Columns>
            <QueryCommand CommandType="Existing"
Select="sp_OrderQuery"/>
            <InsertCommand CommandType="Existing"
Select="sp_OrderInsert"/>
            <UpdateCommand CommandType="Existing"
Select="sp_OrderUpdate"/>
            <DeleteCommand CommandType="Existing"
Select="sp_OrderDelete"/>
            <CustomKey Name="myord_pk">
                    <ColumnRef Name="OrderID"/>
            </CustomKey>
        </CustomTable>
    </CustomTables>
</Database>
```

Inline Query Command

In this scenario the user has a specialized SQL block that they want to execute for Query, and they use the same Stored Procedures as above for CUD. This example requires the user to list the columns explicitly, as well as the primary key for each table, and also makes use of the InlineCommand functionality.

Aside from the InlineCommand for Query (so the CustomTable does not take advantage of BasedOn), this example is identical to the one above so only the changes are shown.

InlineCommands are still eligible to take advantage of Default Binding. By default in the query case there will be a binding created for each Column in the Custom Table to a column in the Result Set with the same name. InlineCommands can take advantage of the SQL "As" keyword to facilitate Default Binding.

RSD File:

```
<Database Name="Northwind">
    <Schema Name="dbo">
        <CustomTable Name="myCustomers">
            <Columns>
                <Column Name="CustomerID" SqlType="nvarchar"
                    Length="10"/>
                <Column Name="CustomerName"
                    SqlType="nvarchar" Length="20"/>
                <Column Name="Address" SqlType="nvarchar"
                    Length="20" />
```

-continued

```
                <Column Name="City" SqlType="nvarchar"
                    Length="20" />
                <Column Name="State" SqlType="nvarchar"
                    Length="20" />
                <Column Name="Comments" SqlType="nvarchar"
                    Length="max" />
            </Columns>
            <QueryCommand>
                <InlineCommand>
                    <Body>Select * From Customers Where
state='WA'</Body>
                </InlineCommand>
            </QueryCommand>
        </CustomTable>
    </CustomTables>
</Database>
```

Inline Update Command

In this scenario the user has a specialized SQL block that they want to execute for Query, and they use the same Stored Procedures as above for CUD. This example requires the user to list the columns explicitly, as well as the primary key for each table, and also makes use of the InlineCommand functionality.

RSD File:

```
<Database Name="Northwind">
    <Schema Name="dbo">
        <CustomTable Name="myCustomers">
            <Columns>
                <Column Name="CustomerID"
                    SqlType="nvarchar" Length="10"/>
                <Column Name="CustomerName"
                    SqlType="nvarchar" Length="20"/>
                <Column Name="Address"
                    SqlType="nvarchar" Length="20" />
                <Column Name="City"
                    SqlType="nvarchar" Length="20" />
                <Column Name="State"
                    SqlType="nvarchar" Length="20" />
                <Column Name="Comments"
                    SqlType="nvarchar" Length="max" />
            </Columns>
            <QueryCommand>
                <InlineCommand>
                    <Body>Select * From Customers Where
                        state='WA'</Body>
                </InlineCommand>
            </QueryCommand>
            <InsertCommand>
                <CommandReference
                    Name="sp_CustomerInsert"/>
            </InsertCommand>
            <UpdateCommand>
                <InlineCommand>
                    <Body>UPDATE Customers SET
                        CustomerName=@CustomerName,
Address=@Address, City=@City, State=@State,
Comments=@Comments WHERE
CustomerID=@CustomerID</Body>
                </InlineCommand>
            </UpdateCommand>
            <DeleteCommand>
                <CommandReference Name="sp_CustomerDelete"/>
            </DeleteCommand>
            <CustomKey Name="mycust_pk">
                <ColumnRef Name="CustomerID"/>
            </CustomKey>
        </CustomTable>
    </CustomTables>
</Database>
```

ExistingSP

This example is the same as the InlineCommand example, but with YTDSales on the Customer. The difference here is that the Stored Procedures are not written as part of the application mapping is developed for. The following features are therefore introduced: explicit binding of parameters; partial binding of parameters; SPs return resultsets—Insert returns the CustomerID that can be propagated back to the target. This result set also makes use of partial binding.

RSD File:

```
<Database Name="Northwind">
    <Schema Name="dbo">
        <CustomTable Name="myCustomers">
            <Columns>
                <Column Name="CompanyName"
                SqlType="nvarchar" Length="20"/>
                <Column Name="CustomerName"
                SqlType="nvarchar" Length="20"/>
                <Column Name="CustomerID"
                SqlType="nvarchar" Length="10"/>
                <Column Name="CustomerYTD"
                SqlType="decimal"/>
            </Columns>
            <QueryCommand>
                <InlineCommand>
                    <Body>
                    Select CustomerId, CompanyName,
                    CustomerName, YTDSales AS
CustomerYTD from udf_AllCustomers( )
                    </Body>
                </InlineCommand>
            </QueryCommand>
            <InsertCommand>
                <CommandReference
                Name="sp_CustomerInsert"/>
                <ParameterBinding Parameter="cid"
                Column="CustomerID" />
                <ParameterBinding Parameter="cname"
                Column="CustomerName" />
                <ColumnBinding Column="NewCustomerID"
CustomColumn="CustomerID"/>
            </InsertCommand>
            <UpdateCommand>
                <ComandReference
                Name="sp_CustomerUpdate"/>
                <ParameterBinding
                Parameter="OriginalCustomerIDToUpdate"
CustomColumn="CustomerID" Version="Original"/>
            </UpdateCommand>
            <DeleteCommand>
                <CommandReference
                Name="sp_CustomerDelete"/>
            </DeleteCommand>
            <CustomKey Name="mycust_pk">
                <ColumnRef Name="CustomerID"/>
            </CustomKey>
        </CustomTable>
    </Schema>
</Database>
```

In this example, the QueryCommand takes advantage of default Column Binding by aliasing the column returned from the udf_AllCustomers () procedure to match the definition in the Columns section of the CustomTable The InsertCommand uses an explicit binding (assuming that the CustomerYTD is not bound, since the InsertCommand's parameters have been declared in the SP definition).

The UpdateCommand uses a partial binding, to bind the parameter for the original key value in the update, but allows the current value to default to the appropriately-named parameter (CustomerId) that is assumed to be declared in the SP definition. The rest of the fields to be updated are also default bound.

Serialization

Custom Tables will be serialized inline with the RSD file under the <CustomTables> element which resides underneath the <Schema> element. As noted above, Custom Tables belong to the RSD-extensions namespace, providing a means for tools which generate/refresh RSD documents from the database to know explicitly which elements they should ignore (as long as those elements are preserved "as-is" by the tool). When generating/refreshing the RSD from a database, Custom Table elements may be invalidated based on metadata changes within the server.

Figure 7:
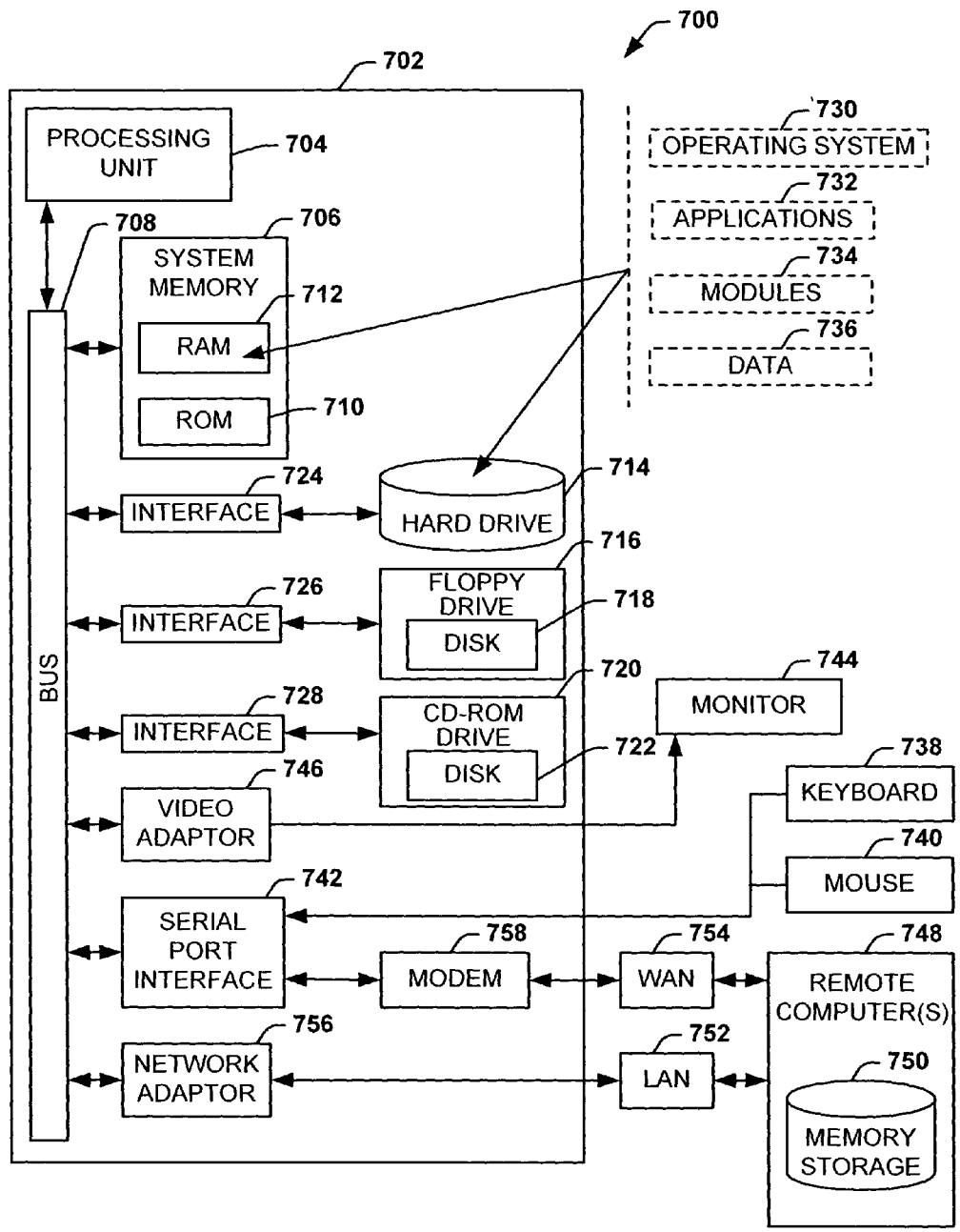
FIG. 7 illustrates a block diagram of a computer operable to execute the disclosed architecture.

Referring now to FIG. 7, there is illustrated a block diagram of a computer operable to execute the disclosed architecture. In order to provide additional context for various aspects of the present invention, FIG. 7 and the following discussion are intended to provide a brief, general description of a suitable computing environment 700 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 7, there is illustrated an exemplary environment 700 for implementing various aspects of the invention includes a computer 702, the computer 702 including a processing unit 704, a system memory 706 and a system bus 708. The system bus 708 couples system components including, but not limited to the system memory 706 to the processing unit 704. The processing unit 704 may be any of various commercially available processors. Dual microprocessors and other multi-processor architectures also can be employed as the processing unit 704.

The system bus 708 can be any of several types of bus structure including a memory bus or memory controller, a peripheral bus and a local bus using any of a variety of commercially available bus architectures. The system memory 706 includes read only memory (ROM) 710 and random access memory (RAM) 712. A basic input/output system (BIOS), containing the basic routines that help to transfer information between elements within the computer 702; such as during start-up, is stored in the ROM 710.

The computer 702 further includes a hard disk drive 714, a magnetic disk drive 716, (e.g., to read from or write to a removable disk 718) and an optical disk drive 720, (e.g., reading a CD-ROM disk 722 or to read from or write to other optical media). The hard disk drive 714, magnetic disk drive 716 and optical disk drive 720 can be connected to the system bus 708 by a hard disk drive interface 724, a magnetic disk drive interface 726 and an optical drive interface 728, respectively. The drives and their associated computer-readable media provide nonvolatile storage of data, data structures, computer-executable instructions, and so forth. For the computer 702, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 712, including an operating system 730, one or more application programs 732, other program modules 734 and program data 736. It is appreciated that the present invention can be implemented with various commercially available operating systems or combinations of operating systems.

A user can enter commands and information into the computer 702 through a keyboard 738 and a pointing device, such as a mouse 740. Other input devices (not shown) may include a microphone, an IR remote control, a joystick, a game pad, a satellite dish, a scanner, or the like. These and other input devices are often connected to the processing unit 704 through a serial port interface 742 that is coupled to the system bus 708, but may be connected by other interfaces, such as a parallel port, a game port, a universal serial bus ("USB"), an IR interface, etc. A monitor 744 or other type of display device is also connected to the system bus 708 via an interface, such as a video adapter 746. In addition to the monitor 744, a computer typically includes other peripheral output devices (not shown), such as speakers, printers etc.

The computer 702 may operate in a networked environment using logical connections to one or more remote computers, such as a remote computer(s) 748. The remote computer(s) 748 may be a workstation, a server computer, a router, a personal computer, portable computer, microprocessor-based entertainment appliance, a peer device or other common network node, and typically includes many or all of the elements described relative to the computer 702, although, for purposes of brevity, only a memory storage device 750 is illustrated. The logical connections depicted include a local area network (LAN) 752 and a wide area network (WAN) 754. Such networking environments are commonplace in offices, enterprise-wide computer networks, intranets and the Internet.

When used in a LAN networking environment, the computer 702 is connected to the local network 752 through a network interface or adapter 756. The adaptor 756 may facilitate wired or wireless communication to the LAN 752, which may also include a wireless access point disposed thereon for communicating with the wireless adaptor 756. When used in a WAN networking environment, the computer 702 typically includes a modem 758, or is connected to a communications server on the LAN, or has other means for establishing communications over the WAN 754, such as the Internet. The modem 758, which may be internal or external, is connected to the system bus 708 via the serial port interface 742. In a networked environment, program modules depicted relative to the computer 702, or portions thereof, may be stored in the remote memory storage device 750. It will be appreciated that the network connections shown are exemplary and other means of establishing a communications link between the computers may be used.

Figure 8:
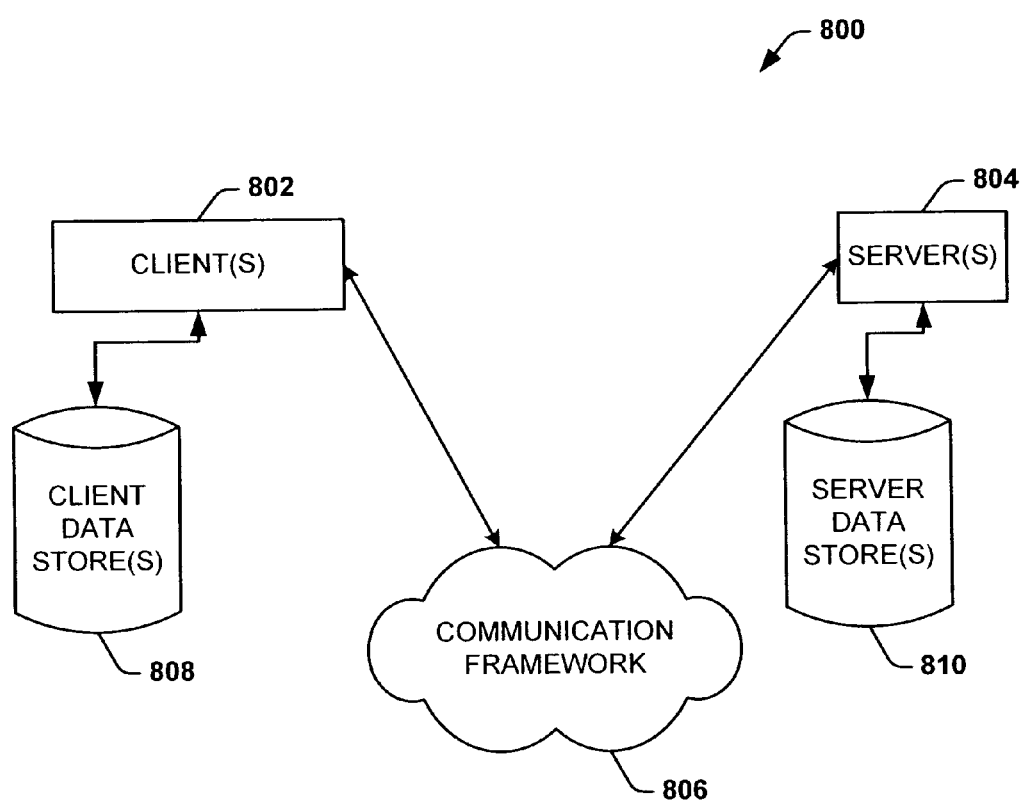
FIG. 8 illustrates a schematic block diagram of an exemplary computing environment in accordance with the present invention.

Referring now to FIG. 8, there is illustrated a schematic block diagram of an exemplary computing environment 800 in accordance with the present invention. The system 800 includes one or more client(s) 802. The client(s) 802 can be hardware and/or software (e.g., threads, processes, computing devices). The client(s) 802 can house cookie(s) and/or associated contextual information by employing the present invention, for example. The system 800 also includes one or more server(s) 804. The server(s) 804 can also be hardware and/or software (e.g., threads, processes, computing devices). The servers 804 can house threads to perform transformations by employing the present invention, for example. One possible communication between a client 802 and a server 804 may be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804. Communications may be facilitated via a wired (including optical fiber) and/or wireless technology. The client(s) 802 are operably connected to one or more client data store(s) 808 that can be employed to store information local to the client(s) 802 (e.g., cookie(s) and/or associated contextual information). Similarly, the server(s) 804 are operably connected to one or more server data store(s) 810 that can be employed to store information local to the servers 804.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A machine-implemented system that facilitates representation of a relational database in a different format, comprising a declarative description component that facilitates generation of data, in an implementation-neutral, declarative format based upon an eXtensible Markup Language (XML) syntax, that represents at least a portion of the relational database, generates a file, and stores the data in the file, the file facilitates reconstruction of the relational database when disconnected from the relational database, wherein the data in the file is a subset of data of the relational database, the selection of the data stored in the file is based in part on access rights, associated with at least one user, to the relational database, the declarative description component facilitates updates to the relational database such that changes to the data in the file while disconnected from the relational database are utilized to update the relational database when the file is connected with the relational database; and a classification component that automatically learns when the file is to be generated and what portion of the relational database is to be utilized to generate the file, and tracks the access behavior of the at least one user with regard to the relational database and automatically regenerates the file based on the most recent schema representation of the at least a portion of the relational database for the at least one user based in part on the access behavior of the at least one user.

2. The system of claim 1, the data is generated from relational database schema information.

3. The system of claim 2, the schema information is in the form of metadata.

4. The system of claim 1, the declarative description component derives logical and physical information from the relational database.

5. The system of claim 4, the physical information is harvested directly from schema information of the relational database.

6. The system of claim 4, the logical information is generated with annotation information associated with the relational database.

7. The system of claim 6, the annotation information is obtained at least one of manually by a user or automatically by the system, or by a combination thereof.

8. The system of claim 6, the logical information describes a relationship between at least two tables of the relational database.

9. The system of claim 1, further comprising a mapping component, associated with the declarative description component, that receives the data and maps the data to at least one of an object component or an XML component, or a combination thereof.

10. The system of claim 1, the data is segmented into smaller data portions.

11. The system of claim 1, the data is segmented to allow logical extensions thereof.

12. The system of claim 1, the data is a logical view of metadata of the relational database.

13. The system of claim 1, the declarative description component generates the data with sufficient metadata to allow generation and/or execution of create, read, update, and delete operations against the relational database.

14. The system of claim 1, the declarative description component derives physical information from the relational database to generate the data, which physical information is regenerated each time the description component executes against the database.

15. The system of claim 1, the data is updated by executing the declarative description component against the database to overwrite the data.

16. The system of claim 1, the updated data preserves user-supplied extensions.

17. The system of claim 1, an application using the data initiates an update process of the data.

18. The system of claim 1, the classification component that performs an automated function, the classification component employs at least one of a probabilistic-based analysis or statistical-based analysis, or a combination thereof, to infer that an automated function be automatically performed.

19. The system of claim 18, the automated function automatically determines at least one of when the data will be updated or what location will be updated, or a combination thereof.

20. The system of claim 18, the classification component is a support vector machine.

21. The system of claim 18, the automated function includes automatically annotating physical information representative of the relational database to generate logical information associated with the relational database.

22. The system of claim 21, the automated function further includes returning a degree of certainty that annotation of the physical information is correct.

23. A computer operating in accordance with the system of claim 1.

24. A machine-implemented system that represents a relational schema of a relational database in a different format, comprising:

a declarative description component that receives the relational schema in the form of at least metadata and generates a data file, in a non-procedural declarative language format based upon an eXtensible Markup Language (XML) syntax, representative of a logical view thereof, the data file represents the relational schema and facilitates regeneration of at least a portion of the relational database when disconnected from the relational database, wherein the data file comprises a subset of data of the relational database, the selection of the subset of data in the data file is based in part on access rights, associated with at least one user, to the relational database, the declarative description component facilitates updates to the relational database such that changes to the metadata in the data file while disconnected from the relational database are utilized to update the relational database when the file is connected with the relational database; and a classification component that automatically learns when the data file is to be generated and what portion of the relational database is to be utilized to generate the data file, and tracks the access behavior of the at least one user with regard to the relational database and automatically regenerates the data file based in part on the most recent schema representation of the at least a portion of the relational database for the at least one user based in part on the access behavior of the at least one user.

25. The system of claim 24, the declarative description component derives logical and physical information from the metadata, which physical information is derived directly from the metadata, and which logical information includes annotations of the physical information.

26. The system of claim 25, the annotation information is added incrementally.

27. The system of claim 24, the data file is segmented into smaller data files to allow logical extensions thereof.

28. The system of claim 24, the data file is stored local to the database.

29. The system of claim 24, the declarative description component runs against the relational database from a location remote from the relational database.

30. The system of claim 24, the relational database is distributed across at least two network locations such that the declarative description component runs against each location database to generate respective data files.

31. The system of claim 30, the respective data files are retrieved and processed to regenerate the relational database.

32. The system of claim 30, the data files are retrieved and processed by corresponding applications in a disconnected environment.

33. The system of claim 24, the format is one of implementation-neutral or implementation-specific.

* * * * *

UNITED STATES PATENT AND TRADEMARK OFFICE
CERTIFICATE OF CORRECTION

| | | |
|---|---|---|
| PATENT NO. | : 7,403,956 B2 | Page 1 of 1 |
| APPLICATION NO. | : 10/652258 | |
| DATED | : July 22, 2008 | |
| INVENTOR(S) | : Alexander Vaschillo et al. | |

It is certified that error appears in the above-identified patent and that said Letters Patent is hereby corrected as shown below:

In column 5, line 7, delete "Oracle." and insert -- Oracle). --, therefor.

Signed and Sealed this

Third Day of May, 2011

David J. Kappos
*Director of the United States Patent and Trademark Office*